(12) United States Patent
Kasai et al.

(10) Patent No.: US 11,237,029 B2
(45) Date of Patent: *Feb. 1, 2022

(54) SENSOR BRACKET

(71) Applicant: HONDA MOTOR CO., LTD., Tokyo (JP)

(72) Inventors: Keita Kasai, Wako (JP); Takahiro Ohmoto, Wako (JP); Yasuyuki Saito, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/706,936

(22) Filed: Dec. 9, 2019

(65) Prior Publication Data

US 2020/0191620 A1     Jun. 18, 2020

(30) Foreign Application Priority Data

Dec. 18, 2018    (JP) ................................ 2018-236623

(51) Int. Cl.
     *B60R 11/04*      (2006.01)
     *G01D 11/30*      (2006.01)
     (Continued)

(52) U.S. Cl.
     CPC .............. *G01D 11/30* (2013.01); *B60R 11/04* (2013.01); *G01D 11/245* (2013.01); *B60R 2011/0026* (2013.01)

(58) Field of Classification Search
     CPC ............. B60R 2011/0049; B60R 11/00; B60R 2011/0026; B60R 2011/0042–2011/0045;
(Continued)

(56) References Cited

U.S. PATENT DOCUMENTS

| 8,944,705 | B1 | 2/2015 | Matori |
| 10,336,264 | B2 | 7/2019 | Okuda |

(Continued)

FOREIGN PATENT DOCUMENTS

| DE | 102014224860 | 6/2016 |
| JP | 2002-341432 | 11/2002 |

(Continued)

OTHER PUBLICATIONS

Japanese Notice of Allowance for Japanese Patent Application No. 2018-236623 dated Jun. 16, 2020.

(Continued)

*Primary Examiner* — John W Miller
*Assistant Examiner* — Humam M Satti
(74) *Attorney, Agent, or Firm* — Amin, Turocy & Watson, LLP

(57) ABSTRACT

A sensor hood (21) includes a bottom surface-forming section (26) that forms a flat bottom surface (26a) facing a detection space (K1). When seen from a height direction (Z1) perpendicular to a surface width direction (X1) and a surface forward/rearward direction (Y1) of the bottom surface (26a), a split section (P1) between a fixed body (30) and a split body (40) divides the bottom surface (26a) into a first range (H1) including an optical axis (CL3) in the surface width direction (X1) and a second range (H2) that avoids the optical axis (CL3). The first range (H1) is disposed at the same height as the second range (H2) in the height direction (Z1) and disposed closer to the optical axis (CL3) than the second range (H2).

22 Claims, 18 Drawing Sheets

(51) Int. Cl.
   *G01D 11/24*   (2006.01)
   *B60R 11/00*   (2006.01)

(58) Field of Classification Search
   CPC ....... B60R 2011/005; B60R 2011/0061; B60R 2011/0059; B60R 2011/0064; B60R 2011/0071–2011/0075; B60R 2011/0078; B60R 2011/008; B60R 2011/0084; G02B 6/2171; G02B 6/0218; G02B 6/02209–6/02219
   See application file for complete search history.

(56) References Cited

U.S. PATENT DOCUMENTS

| 2005/0001901 | A1  | 1/2005 | Eggers et al. |
| 2007/0041725 | A1* | 2/2007 | Neumann ............. B60S 1/0822 396/419 |
| 2015/0015713 | A1* | 1/2015 | Wang ................... H05K 999/99 348/148 |
| 2015/0251605 | A1  | 9/2015 | Uken et al. |
| 2017/0240120 | A1* | 8/2017 | Krug ..................... H04N 5/2252 |
| 2019/0064636 | A1* | 2/2019 | Kang ..................... G03B 17/02 |

FOREIGN PATENT DOCUMENTS

| JP | 2005-022643 | 1/2005 |
| JP | 2015-509458 | 3/2015 |
| JP | 2017-171165 | 9/2017 |
| JP | 2017-171167 | 9/2017 |
| JP | 2018-522285 | 8/2018 |
| WO | 2014/141357 | 9/2014 |

OTHER PUBLICATIONS

Non-Final Office Action for U.S. Appl. No. 16/665,038 dated May 27, 2021.
Japanese Office Action for Japanese Patent Application No. 2018-236622 dated Nov. 2, 2021.
Japanese Office Action for Japanese Patent Application No. 2018-236624 dated Nov. 2, 2021.

\* cited by examiner

SENSOR BRACKET

BACKGROUND OF THE INVENTION

Field of the Invention

The present invention relates to a sensor bracket.

Priority is claimed on Japanese Patent Application No. 2018-236623, filed on Dec. 18, 2018, the content of which is incorporated herein by reference.

Description of Related Art

In the related art, transportation equipment includes a camera as an external field-detecting sensor, and a bracket configured to support the camera on a transportation equipment main body (for example, see German Patent Application, Publication No. 102014224860). The bracket forms a lens hood of the camera. A bottom surface portion of the lens hood has a fan shape having a lateral width that increases away from the lens according to an angle of view of the lens. The bottom surface portion of the lens hood is detachable from the remaining portion, and can provide access to the lens hood upon maintenance or the like.

SUMMARY OF THE INVENTION

However, cameras in recent years have a wide angle of visibility, and thus, in order to be able to attach and detach parts that widen according to an angle of view like the bottom surface portion, the detached and attached parts may be increased in size, and maintenance work around the sensor hood may become difficult. In addition, while a projecting or indented pattern generated on a front surface in the lens hood by a detachable structure can be considered, when the projecting or indented pattern has a surface facing the lens, since irregular reflection of light or the like toward the lens may occur, the detachable structure should be provided carefully.

Here, the present invention is directed to providing a sensor bracket including a sensor hood, configured to support an external field-detecting sensor, and capable of facilitating maintenance work around a sensor hood and minimizing the occurrence of reflected waves toward a detection unit.

An aspect of the present invention is directed to providing a sensor bracket (20) including: a sensor hood (21) extending in a detecting direction (F1) from a side of a detection unit (12) of an external field-detecting sensor (10) configured to detect electromagnetic waves, and surrounding a detection space (K1) through which a detection center axis (CL3) of the detection unit (12) passes, wherein the sensor hood (21) includes a front surface-forming section (26) that forms a flat front surface (26a) facing the detection space (K1), the front surface-forming section (26) includes a fixed body (30) including a part (26a1) of the front surface (26a) and a split body (40) including another part (26a2) of the front surface (26a) and configured to be separable from the fixed body (30), where a direction perpendicular the detecting direction (F1) in the front surface (26a) when seen in a plan view is referred to as a surface width direction (X1), a direction perpendicular to the surface width direction (X1) in the front surface (26a) when seen in a plan view is referred to as a surface forward/rearward direction (Y1), and a direction perpendicular to the surface width direction (X1) and the surface forward/rearward direction (Y1) is referred to as a height direction (Z1), when seen from the height direction (Z1), a split section (P1) between the fixed body (30) and the split body (40) divides the front surface (26a) into a first range (H1) including the detection center axis (CL3) in the surface width direction (X1) and a second range (H2) that avoids the detection center axis (CL3), and the first range (H1) is disposed at the same height as the second range (H2) in the height direction (Z1) or disposed closer to the detection center axis (CL3) than the second range (H2).

According to this configuration, since the front surface-forming section that forms the flat front surface facing the detection space in the sensor hood includes the fixed body and the split body that is separable from the fixed body, even in the case of access to the sensor hood during maintenance, attached and detached parts may be small. That is, when an angle of view or a radiation/incidence angle is widened due to improvement in performance of the external field-detecting sensor, since a wide and flat front surface is formed on the sensor hood according to the widening, in the configuration in which the front surface-forming section that forms the front surface is attached and detached as a whole, attached and detached parts may be large and workability may be decreased. On the other hand, since the front surface-forming section that forms the flat front surface includes the split body that is separable from the fixed body, parts that are attached and detached in the case of access to the sensor hood may be small, and workability can be improved.

Here, since the front surface-forming section is divided, in the split section between the fixed body and the split body, a step difference may occur in the flat front surface. Here, since the first range including the detection center axis in the front surface in the surface width direction is set to be disposed closer to the detection center axis in the height direction than the second range that does not include the detection center axis in the front surface in the surface width direction, even when a step difference occurs between the fixed body and the split body, the stepped surface (a surface crossing the front surface) is disposed so as not to be directed toward the detection center axis. Accordingly, irregular reflection of electromagnetic waves toward the detection unit can be minimized, and an influence of the sensor on detection accuracy can be minimized. When the fixed body and the split body are flush with each other (when no step difference occurs), irregular reflection of electromagnetic waves toward the detection unit can be minimized as long as there is no surface directed toward the detection center axis.

The term "flat shape" means that there is substantially no large step difference, curve, or the like, and may also include the case in which a slight curve, a projecting or indented portion for fixing or reinforcement, or the like is present.

In the sensor bracket (20) of the aspect, the front surface (26a) may include a reflected wave-reducing structure (25) configured to reduce reflected waves that reach the detection unit (12).

According to this configuration, when the front surface-forming section including the reflected wave-reducing structure is provided as the split structure while irregular reflection of light or the like toward the lens is minimized by the reflected wave-reducing structure, irregular reflection of light or the like toward the lens can be appropriately minimized even if a step difference occurs in the flat front surface (the reflected wave-reducing structure).

In the sensor bracket (20) of the aspect, the first range (H1) of the front surface (26a) may be disposed further inside the front surface (26a) in the surface width direction (X1) than the split section (P1), and constituted by the split body (40).

According to this configuration, since the inner side of the front surface in the surface width direction is constituted by the split body, attachment and detachment work or the like can be simplified using the split body as a single configuration, and the split structure can be efficiently provided.

In the sensor bracket (20) of the aspect, the fixed body (30) may include a fixed-side opening section (37) that is fitted into and closes the split body (40), and an outer circumferential section (40a) of the split body (40) may include an overlapping section (40b) that overlaps an inner circumferential section (37a) of the fixed-side opening section (37) from a side of a back surface (26b) that is a surface opposite to the front surface (26a) of the front surface-forming section (26).

According to this configuration, since the outer circumferential section of the split body includes the overlapping section that overlaps the inner circumferential section of the fixed-side opening section from the side of the back surface of the front surface-forming section, during attachment of the split body, the split body can be prevented from dropping into the fixed-side opening section. In addition, when seen from the height direction in a state in which the split body is attached to the fixed-side opening section, since the overlapping occurs between the outer circumferential section of the split body and the inner circumferential section of the fixed-side opening section to eliminate the occurrence of the gap, intrusion of electromagnetic waves into the sensor hood can be minimized.

In the sensor bracket (20) of the aspect, the fixed body (30) may include a fixed-side opening section (37) that is fitted into and closes the split body (40), and each of the outer circumferential section (40a) of the split body (40) and the inner circumferential section (37a) of the fixed-side opening section (37) may include a first direction abutting surface (37s1, 40s1) that is able to abut the other in a direction (Z1) crossing the front surface (26a) and a second direction abutting surface (37s2, 40s2) that is able to abut the other in a direction (X1, Y1) along the front surface (26a).

According to this configuration, since each of the outer circumferential section of the split body and the inner circumferential section of the fixed-side opening section includes the first direction abutting surface that is able to abut the other in the direction crossing the front surface and the second direction abutting surface that is able to abut the other in the direction along the front surface, when the split body is fitted into the fixed-side opening section, a position of the split body is regulated in the direction crossing the front surface of the front surface-forming section by the first direction abutting surface, and a position of the split body is regulated in the direction along the front surface of the front surface-forming section by the second direction abutting surface. Accordingly, attachment of the split body to the regulated position can be facilitated. In an area in which the first direction abutting surface is formed, since the overlapping occurs between the outer circumferential section of the split body and the inner circumferential section of the fixed-side opening section, intrusion of electromagnetic waves into the sensor hood can be minimized.

In the sensor bracket (20) of the aspect, the fixed body (30) may include a fixed-side opening section (37) that is fitted into and closes the split body (40), and at least one of the outer circumferential section (40a) of the split body (40) and the inner circumferential section (37a) of the fixed-side opening section (37) may include an inclined surface (37s3, 40s3) that is inclined to be disposed closer to an outer circumferential side of the fixed-side opening section (37) toward a side of the back surface (26b) that is a surface opposite to the front surface (26a) of the front surface-forming section (26) and overlaps the other in the direction (X1, Y1) along the front surface (26a).

According to this configuration, at least one of the outer circumferential section of the split body and the inner circumferential section of the fixed-side opening section includes the inclined surface inclined to be disposed closer to the outer circumferential side of the fixed-side opening section as it goes toward the back surface, at least one of an aspect in which the inner circumferential section of the fixed-side opening section is formed to widen toward the back surface (an outer side of the sensor hood) and an aspect in which the outer circumferential section of the split body is formed to narrow toward the front surface (an inner side of the sensor hood) is realized. Accordingly, the split body is easily attached from the outer side of the sensor hood. In an area in which the inclined surface is formed, since the overlapping occurs between the outer circumferential section of the split body and the inner circumferential section of the fixed-side opening section, intrusion of electromagnetic waves into the sensor hood can be minimized.

In the sensor bracket (20) of the aspect, a recess section (48c) may be formed in the split body (40) on a side of the back surface (26b) that is a surface opposite to the front surface (26a).

According to this configuration, since the recess section is formed in the split body, a load of attachment and detachment work of the split body can be reduced while achieving reduction in weight of the split body and reducing a load of an area to which the split body is attached.

In the sensor bracket (20) of the aspect, a functional part (49) may be disposed in the split body (40) on a side of the back surface (26b) that is a surface opposite to the front surface (26a).

According to this configuration, since the recess section formed in the split body is used as a disposition space of the functional parts, dead space can be effectively utilized.

In the sensor bracket (20) of the aspect, the functional part (49) may be a heater (49) configured to increase a temperature in the detection space (K1).

According to this configuration, since the heater is close to the detection space to efficiently increase the temperature, clouding of the transmission member such as a window glass or the like that the sensor hood abuts can be effectively minimized.

In the sensor bracket (20) of the aspect, the sensor hood (21) may be disposed with the front surface (26a) directed upward.

According to this configuration, since the flat front surface is disposed in a vertical upward direction, even when cleaning of dust or the like is required, cleaning is facilitated by removing the split body, and detection accuracy can be appropriately maintained.

In the sensor bracket (20) of the aspect, the sensor hood (21) may include a side surface-forming section (27) that forms a side surface (27a) standing upward from an end portion of the front surface (26a) in the surface width direction (X1), and a curved surface (29a) having a recessed shape and connecting the front surface (26a) and the side surface (27a) may be formed in a corner section (29) between the front surface-forming section (26) and the side surface-forming section (27).

According to this configuration, since the curved surface having a recessed shape is provided in the corner section in which the front surface and the side surface cross each other, even when the front surface is cleaned, cleaning is easily performed in the corner section in which the front surface and the side surface cross each other, and detection accuracy can be appropriately maintained.

In the sensor bracket (20) of the aspect, the front surface (26a) and the curved surface (29a) may be provided with a reflected wave-reducing structure (25) configured to reduce reflected waves that reach the detection unit (12).

According to this configuration, since the reflected wave-reducing structure is also provided in the curved surface of the corner section in which the front surface and the side surface cross each other as well as the flat front surface, irregular reflection toward the detection unit can be further minimized.

According to the aspect of the present invention, in the sensor bracket including the sensor hood and configured to support the external field-detecting sensor, the occurrence of reflected waves toward the detection unit can be minimized while facilitating maintenance work around the sensor hood.

DETAILED DESCRIPTION OF THE INVENTION

Figure 1:
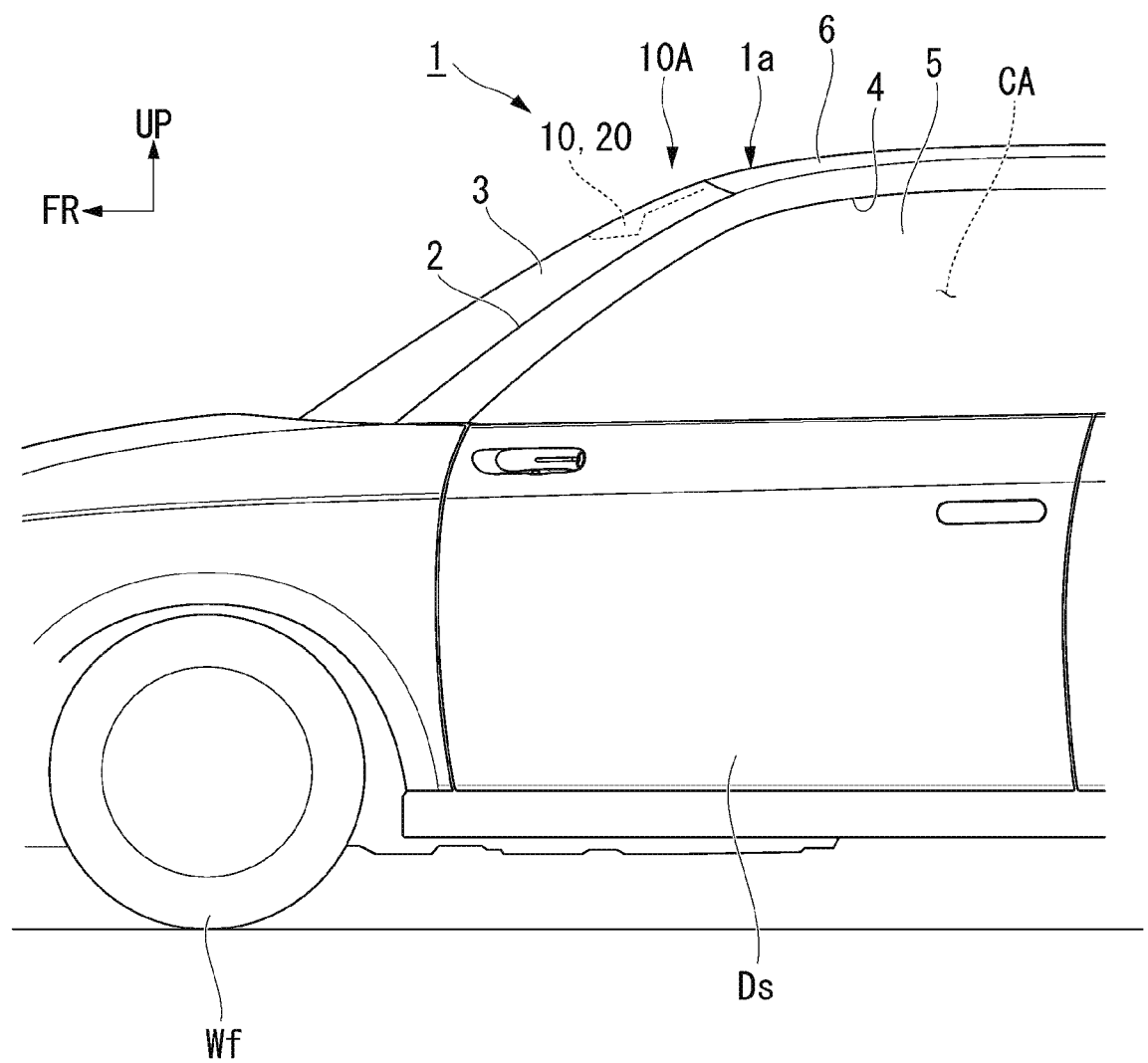
FIG. 1 is a left side view of major parts of a vehicle according to an embodiment of the present invention.

Hereinafter, an embodiment of the present invention will be described with reference to the accompanying drawings. Further, directions of forward, rearward, leftward, rightward, and so on in the following description are the same as directions in a vehicle described below unless the context clearly indicates otherwise. In addition, in appropriate places in the drawings used in the following description, an arrow FR indicates a forward direction with respect to the vehicle, an arrow LH indicates a leftward direction with respect to the vehicle, an arrow UP indicates an upward direction with respect to the vehicle, and a line CL1 indicates a vehicle lateral center.

FIG. 1 is a left side view of major parts of a vehicle 1 of an embodiment.

As shown in FIG. 1, the vehicle (transportation equipment) 1 of the embodiment includes a front window (a window) 2 and a front window glass (a windshield) 3 in front of a passenger compartment CA, and includes side windows (windows) 4 and side window glasses 5 on both sides of the passenger compartment CA. Reference sign 6 designates a roof over the passenger compartment CA, reference sign Wf designates front wheels, reference sign Ds designates side doors, and reference sign 1a designates a vehicle main body (a transportation equipment main body) 1a. The vehicle main body 1a of the embodiment is a portion (an object to which the external field-detecting camera 10 and the camera bracket 20 are attached) obtained by removing an external field-detecting camera 10 and a camera bracket 20 from the vehicle 1.

The external field-detecting camera 10 is installed as an external field-detecting sensor on an upper section of the front window glass 3 and on an inner surface 3a side (the passenger compartment CA side) of a lateral central section. The external field-detecting camera 10 is a digital camera using a solid-state image sensing device, for example, a charge coupled device (CCD), a complementary metal oxide semiconductor (CMOS), or the like. The external field-detecting camera 10 images a side in front of the vehicle repeatedly, for example, periodically. Information detected by the external field-detecting camera 10 is provided for recognition of a position, a type, a speed, and the like of an object in a detecting direction, and driving assist control, automatic driving control, or the like of the vehicle 1 is performed based on the recognition. Reference sign 10A designates an attachment structure of the external field-detecting sensor (camera).

Figure 2:
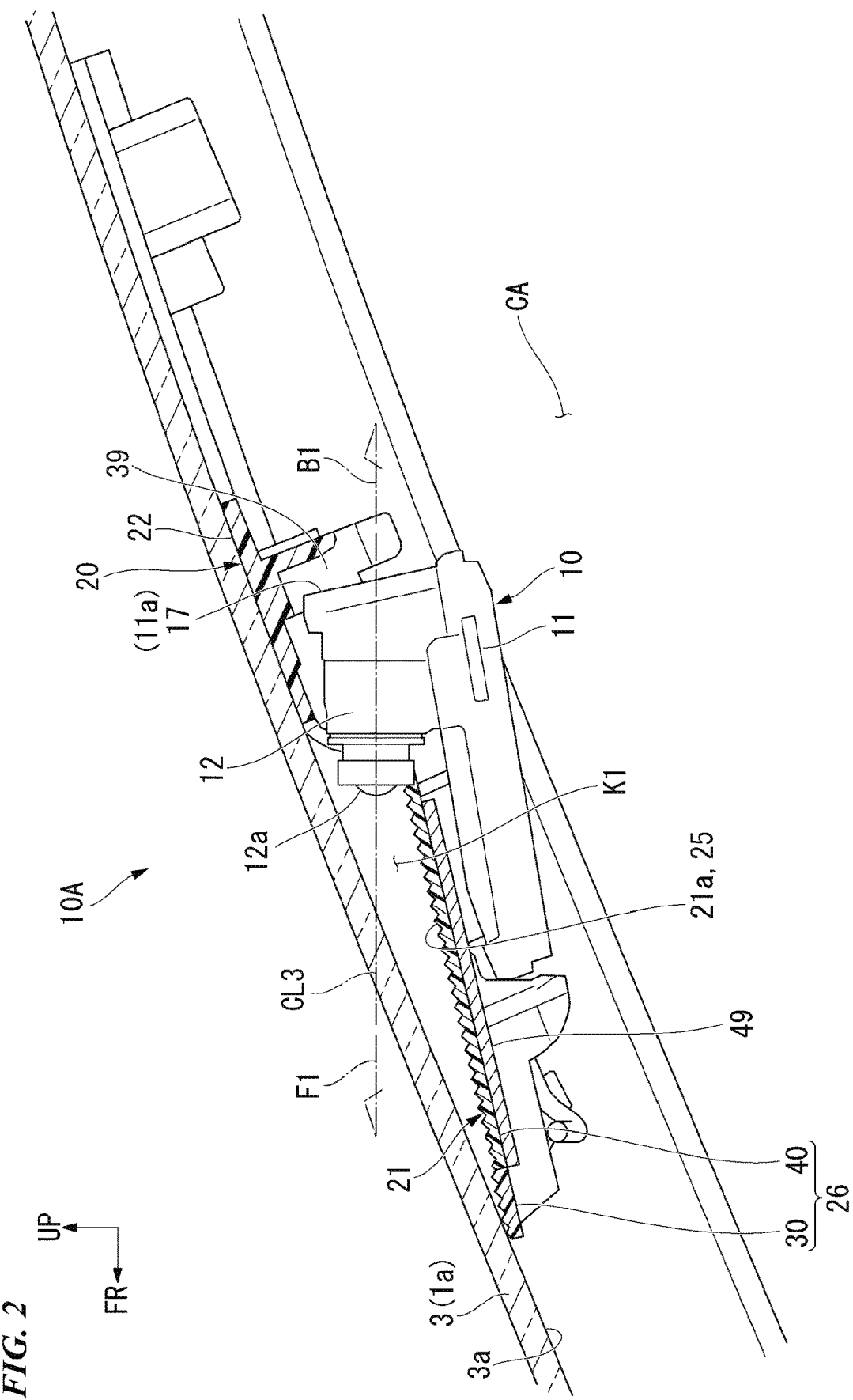
FIG. 2 is a left side view including a partial cross section around an external field-detecting camera of the vehicle according to the embodiment of the present invention.
Figure 3:
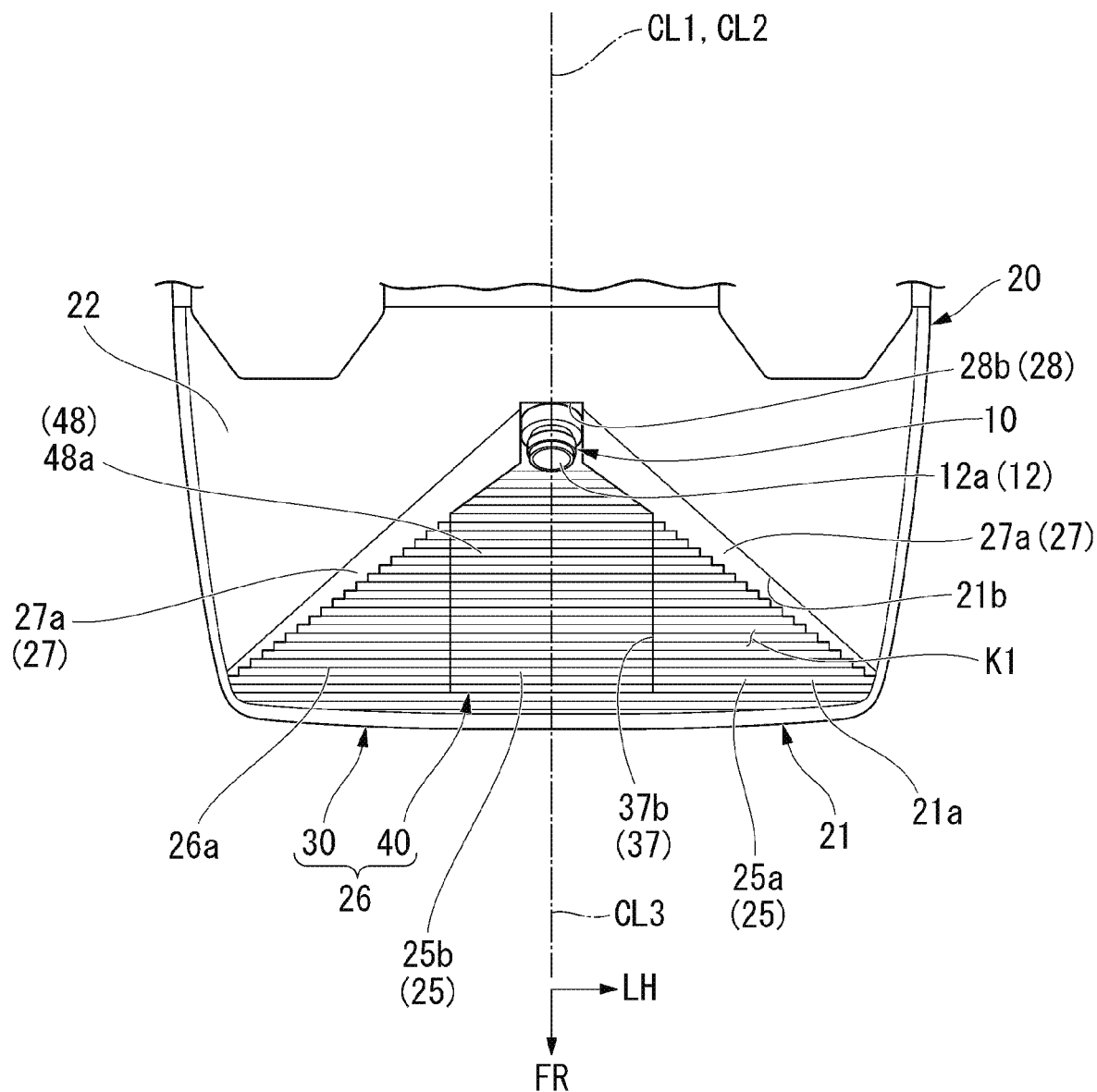
FIG. 3 is a plan view showing a camera bracket that supports the external field-detecting camera from a front surface side thereof.
Figure 4:
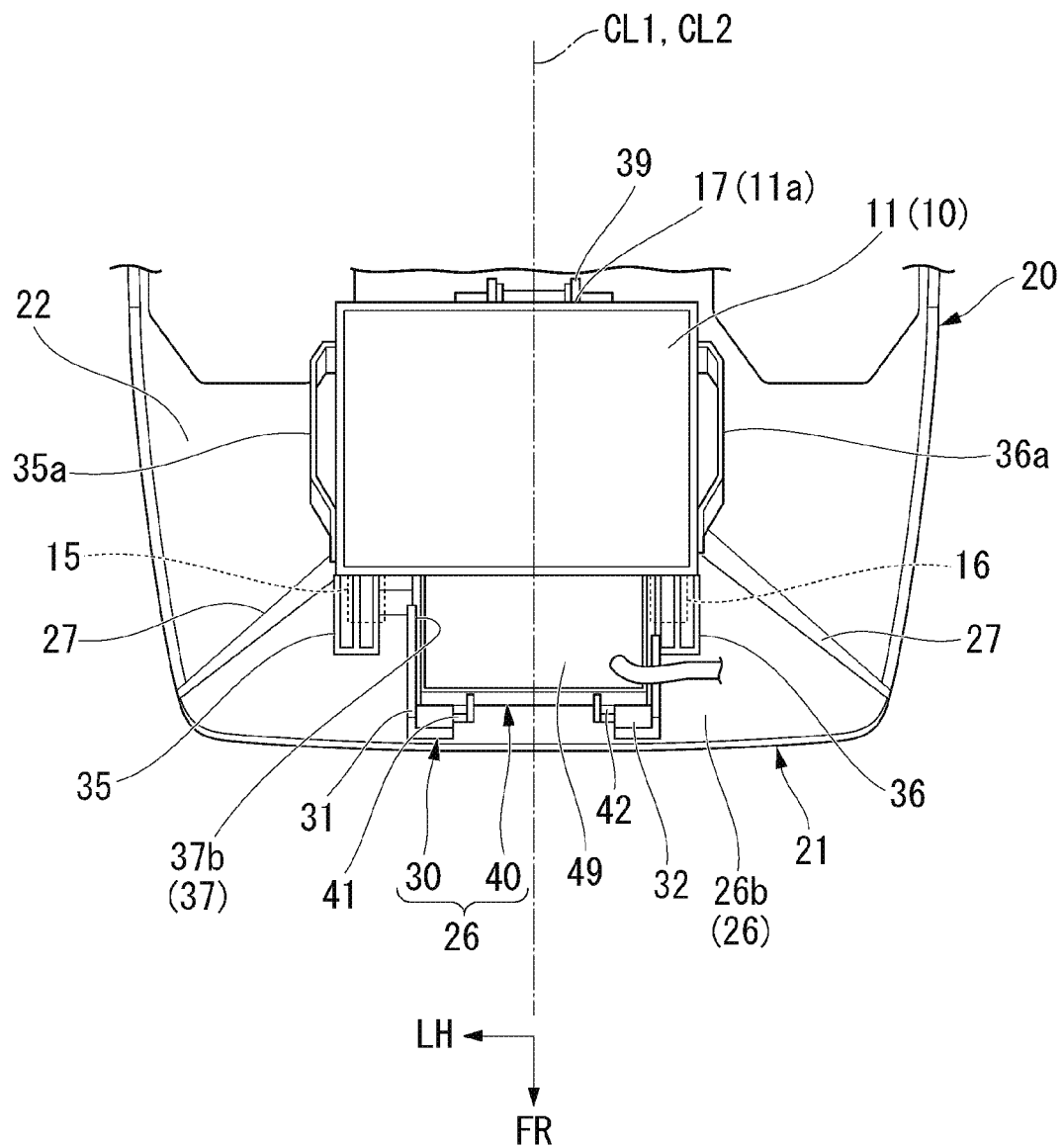
FIG. 4 is a plan view showing the camera bracket that supports the external field-detecting camera from a back surface side thereof.

FIG. 2 is a left side view including a partial cross section around the external field-detecting camera 10 of the vehicle 1, FIG. 3 is a plan view of the camera bracket 20 that supports the external field-detecting camera 10 from a front surface side (a bottom surface 26a side of a bottom surface-forming section 26 in a thickness direction (to be described below)), and FIG. 4 is a plan view of the camera bracket 20 that supports the external field-detecting camera 10 from a back surface side (a back surface 26b side of the bottom surface-forming section 26 in the thickness direction (to be described below)). Further, covers that cover surroundings of the external field-detecting camera 10 from a side of the passenger compartment are shown.

As shown in FIG. 2 to FIG. 4, the external field-detecting camera 10 includes a main body section 11 having a flat shape and a thickness minimized in an upward/downward direction, and a columnar lens 12 disposed above a rear section of the main body section 11. The lens 12 is disposed with an optical axis CL3 serving as a central axis in a substantially horizontal posture, and a lens surface 12a directed toward a side in front of the vehicle (in a detecting direction). An arrow F1 in FIG. 2 indicates a detecting direction along the optical axis CL3 in the external field-detecting camera 10, and an arrow B1 indicates a direction opposite to the detecting direction. In the embodiment, the detecting direction is a direction toward a side in front of the vehicle, and the opposite direction is a direction toward a side behind the vehicle. That is, in a direction of an optical axis that is bidirectional, one direction is a detecting direction, and the other direction is an opposite direction. The external field-detecting camera 10 is configured to be substantially symmetrical with respect to the optical axis CL3 in appearance.

The external field-detecting camera 10 is fixed to the inner surface 3a of the front window glass 3 inclined rearward and upward via the camera bracket 20. The camera bracket 20 is an injection-molded article formed of, for example, a synthetic resin, and glued to the inner surface 3a of the front window glass 3 by an adhesive agent or the like. The camera bracket 20 is provided to follow an inclination of the front window glass 3, and the external field-detecting camera 10 is attached to the camera bracket 20 from the passenger compartment side. Surroundings of the camera bracket 20 and the external field-detecting camera 10 are covered with a camera cover (not shown) from the passenger compartment side.

Figure 9:
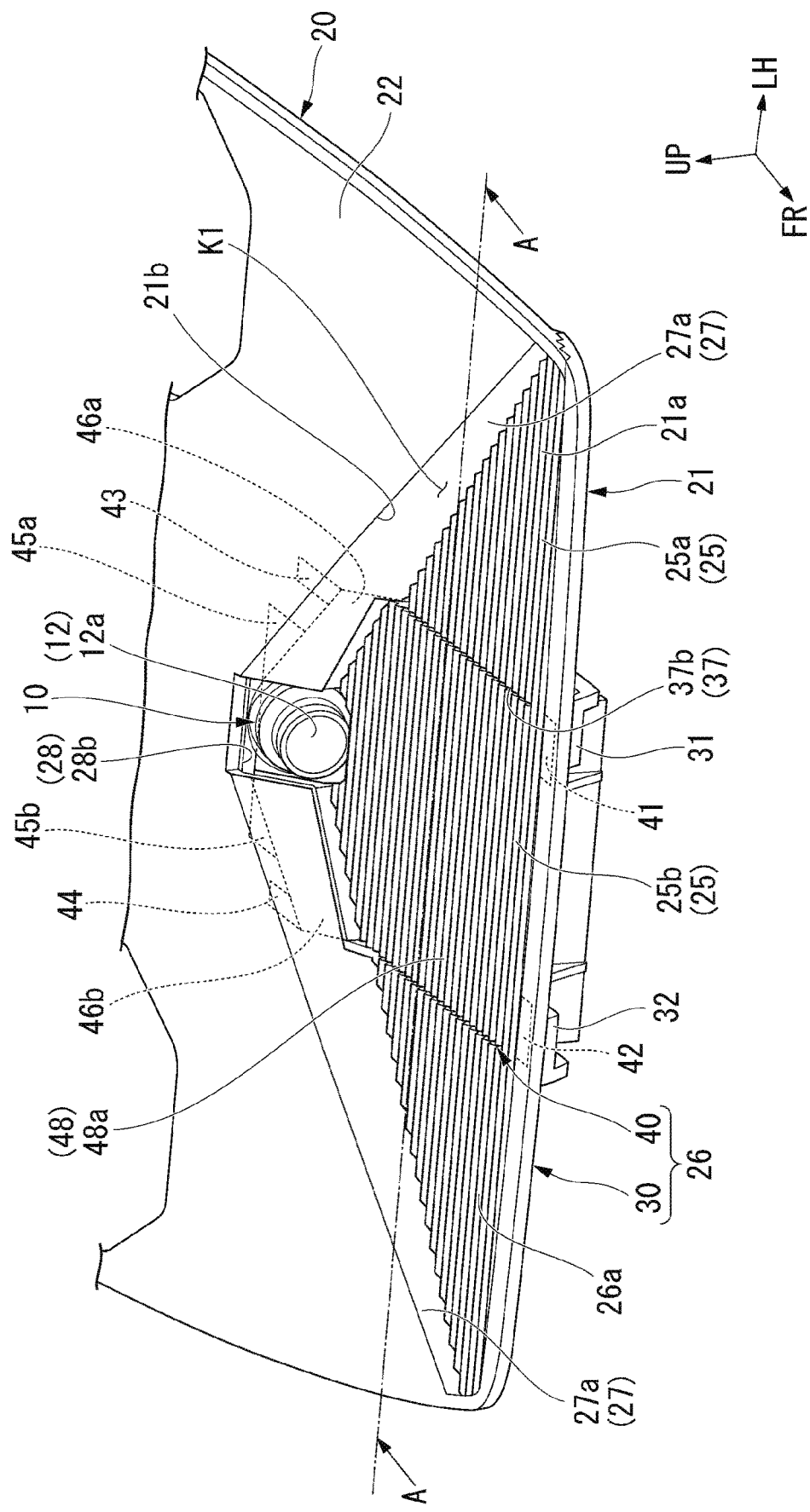
FIG. 9 is a perspective view of the camera bracket that supports the external field-detecting camera.

Referring also to a perspective view of FIG. 9, the camera bracket 20 has a lens hood 21 that surrounds a detection space K1 extending from the lens 12 side of the external field-detecting camera 10 in a detecting direction, and a gluing section 22 glued to the inner surface 3a of the front window glass 3, which are formed integrally with each other. An opening section 28 for a lens that forms an opening 28b configured to expose the lens 12 of the external field-detecting camera 10 from the passenger compartment side into the lens hood 21 is provided in a substantially central section of the camera bracket 20. The lens hood 21 is formed to have a lateral width that increases forward from the opening section 28 for a lens to a front side. An optical axis (a detection center axis) CL3 of the lens 12 passes the detection space K1 from a center of the lens 12, and reaches the front window glass 3 that closes an opening 21b of the lens hood 21.

The lens hood 21 includes the bottom surface-forming section 26 that forms the bottom surface 26a facing the detection space K1 from below, and a side surface-forming section 27 that forms side surfaces 27a facing the detection space K1 from left and right sides. The bottom surface 26a is a planar surface parallel to the vehicle leftward/rightward direction and inclined forward and downward with respect to the vehicle forward/rearward direction and the optical axis CL3 when seen in a side view. The bottom surface 26a and the bottom surface-forming section 26 are formed in a triangular shape having a lateral width that widens forward when seen in a plan view in a direction perpendicular to the bottom surface 26a. "When seen in a plan view" in the embodiment means being seen in a direction perpendicular to the bottom surface 26a unless the context indicates otherwise, and "plan view" in the embodiment is a plan view seen in a direction perpendicular to the bottom surface 26a unless the context indicates otherwise. The bottom surface 26a is not limited to a plane in a strict sense, but may be a reference surface (a virtual plane) for forming (arranging) a projecting or indented pattern of a reflected wave-reducing structure 25, which will be described below.

Hereinafter, a direction perpendicular to a detecting direction F1 in the bottom surface 26a when seen in a plan view (two directions, left and right along the bottom surface 26a) is referred to as a surface width direction X1, a direction perpendicular to the surface width direction X1 in the bottom surface 26a when seen in a plan view (two directions, forward and rearward along the bottom surface 26a) is referred to as a surface forward/rearward direction Y1, and a direction perpendicular to the surface width direction X1 and the surface forward/rearward direction Y1 (two directions, up and down perpendicular to the bottom surface 26a) is referred to as a height direction Z1. Viewing from the height direction Z1 corresponds to viewing when seen in a plan view.

The bottom surface 26a having a large width in the surface width direction X1 is formed on the lens hood 21, and the reflected wave-reducing structure 25 is also formed to have a large width in the surface width direction X1. The bottom surface 26a has a fan shape having a lateral width that increases away from the lens 12 according to an angle of view of the lens 12. The bottom surface 26a widens in the surface width direction X1 away from the lens 12 in the detecting direction F1. The bottom surface 26a is not limited to a perfect plane, and may be a planar shape having substantially no large step difference, curve, or the like (including also a case in which a gentle curve, a projecting or indented pattern for fixing or reinforcement, or the like is present). When the bottom surface 26a has a gentle curve, for example, a direction along a straight line crossing both ends of the bottom surface 26a is the surface width direction X1.

The side surfaces 27a and the side surface-forming section 27 are formed to be curved upward and rearward and stand upward from left and right inclined side sections of both sides of the rear section of the bottom surface-forming section 26. The side surfaces 27a are formed such that a standing height upward and rearward from left and right side edge portions of the opening section 28 for a lens gradually decreases toward both of left and right end portions of a front edge portion of the bottom surface-forming section 26. A vertical width of the side surfaces 27a is smaller than a lateral width of the bottom surface 26a, and thus the lens hood 21 and the detection space K1 are formed in a flat shape having a minimized vertical width.

An upper surface section of the lens hood 21 forms the opening 21b that is located in a detecting direction of the external field-detecting camera 10. The opening 21b is formed to be surrounded by an upper edge portion of the opening section 28 for a lens, upper edge portions of left and right side surface-forming sections 27, and a front edge portion of the bottom surface-forming section 26. The opening 21b is closed by the inner surface 3a of the front window glass 3 in a state in which the lens hood 21 and the camera bracket 20 are fixed to the front window glass 3. The front window glass 3 is an example of a transmission member disposed in a detecting direction of the external field-detecting camera 10, and allows light (electromagnetic waves) detected by the external field-detecting camera 10 to pass therethrough.

The lens hood 21 includes a reflected wave-reducing structure (a stray light shield (SLS)) 25 disposed on at least a part of a front surface 21a (the bottom surface 26a and left and right side surfaces 27a) facing the detection space K1 (in the embodiment, the bottom surface 26a) and configured to reduce reflected light (reflected waves) that reaches the lens 12. The reflected wave-reducing structure 25 of the embodiment is formed such that, for example, a plurality of wave pattern forms extending in a triangular cross section in the leftward/rightward direction are arranged in the forward/rearward direction. Arrival of stray light (stray radiation, reflected waves) at the lens 12 of the external field-detecting camera 10 is minimized by the reflected wave-reducing structure 25.

The bottom surface 26a has a reference surface (a virtual plane) when the three-dimensional shape is formed in the case in which the reflected wave-reducing structure 25 having a three-dimensional shape such as a wave pattern form or the like is provided. A plurality of pattern forms such as wave pattern forms or the like of the reflected wave-reducing structure 25 are arranged along the reference surface. The pattern forms are not limited to a constant period and may have a predetermined change or may be irregular. In addition, the pattern forms are not limited to the three-dimensional shape and may be obtained through surface treatment such as crimping, painting, or the like. The reflected wave-reducing structure 25 may be provided on the side surfaces 27a of the lens hood 21.

A median line CL2 in FIG. 3 and FIG. 4 indicates a lateral center of the camera bracket 20. The camera bracket 20 is configured to be substantially symmetrical with respect to the line CL2. The camera bracket 20 causes a lateral center CL2 to coincide with a vehicle lateral center CL1 when seen in a plan view. The external field-detecting camera 10 causes the optical axis CL3 to coincide with the lateral center CL2 and the vehicle lateral center CL1 of the camera bracket 20 when seen in a plan view. For example, when the external field-detecting camera 10 is installed while being shifted from the vehicle lateral center CL1, the external field-detecting camera 10 may be disposed while the lateral center CL2 of the camera bracket 20 is shifted from the vehicle lateral center CL1 and the optical axis CL3 of the external field-detecting camera 10 is shifted from the lateral center CL2 of the camera bracket 20. In addition, the camera bracket 20 or the external field-detecting camera 10 may be asymmetrically configured.

Figure 12:
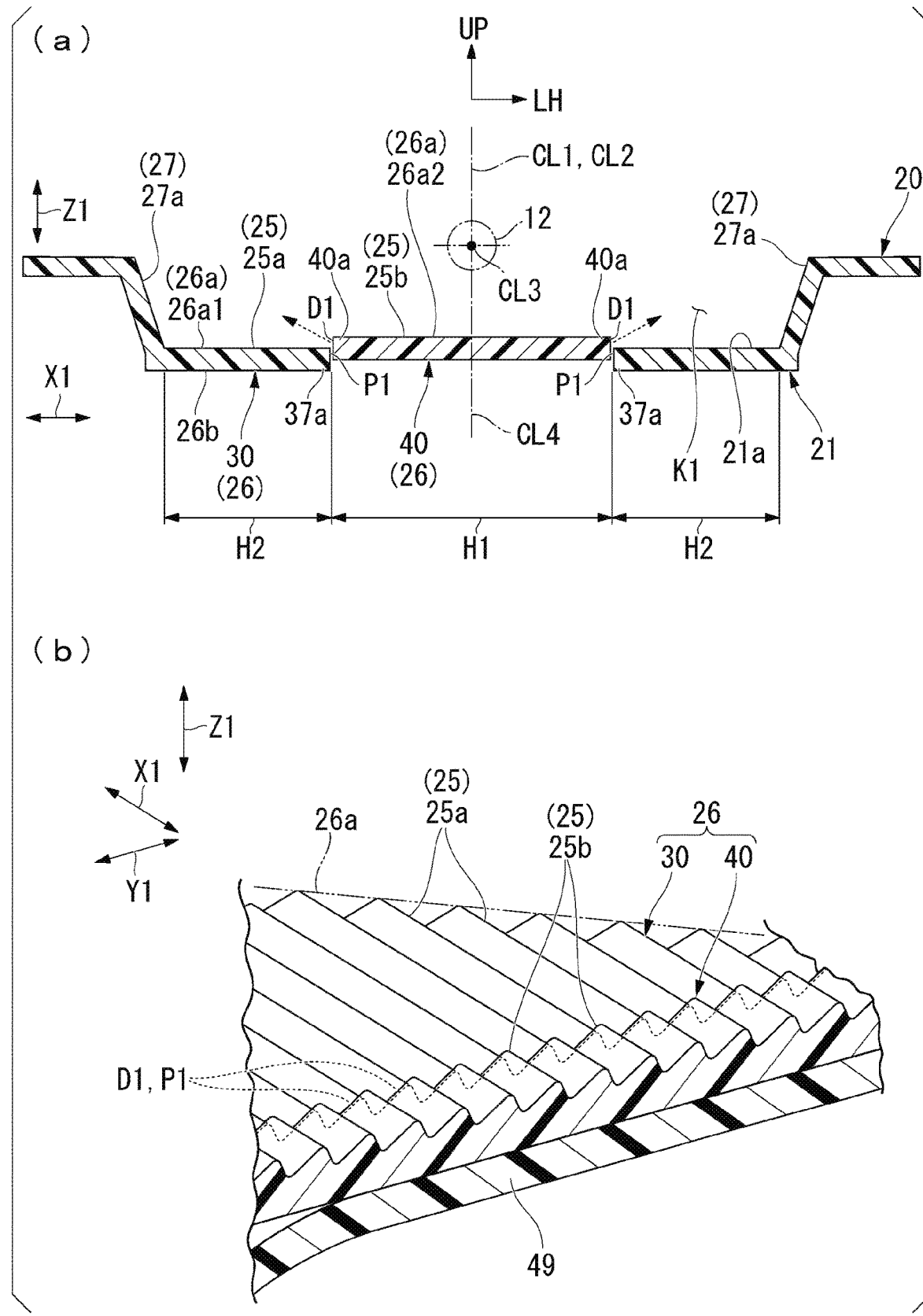
FIG. 12(a) is a view for description corresponding to the cross-sectional view along line A-A in FIG. 9.
FIG. 12(b) is a perspective view around a split section.

Referring to FIG. 3 and FIG. 9, the bottom surface-forming section 26 that forms the bottom surface 26a including the reflected wave-reducing structure 25 in the lens hood 21 is separately constituted by a fixed body 30 including a part (a fixed-side structure section 25a) of the reflected wave-reducing structure 25 and fixed to the vehicle main body 1a (for example, the front window glass 3), and a split body 40 including the remaining portion (a split-side structure section 25b) of the reflected wave-reducing structure 25 and configured to be separable from the fixed body 30. Referring to FIG. 12(a), the bottom surface-forming section 26 includes the fixed body 30 including a part (a fixed-side bottom surface 26a1) of the bottom surface 26a and fixed to the vehicle main body 1a, and the split body 40 including another part (a split-side bottom surface 26a2) of the bottom surface 26a and configured to be separable from the fixed body 30. The fixed body 30 is formed integrally with the gluing section 22, and can be regarded as the integrated fixed body 30 including the gluing section 22.

Referring also to FIG. 4 to FIG. 8, the split body 40 is provided in a substantially rectangular range overlapping the optical axis CL3 when seen in a plan view. Specifically, a flat plate section 48 (see FIG. 7 and FIG. 8) that forms a schematic shape when seen in a plan view of the split body 40 includes a front side section 40a1 extending in the vehicle leftward/rightward direction, left and right side sections 40a2 extending in the vehicle forward/rearward direction, left and right rearward-inclined side sections 40a3 inclined and extending to be disposed forward as they go outward from left and right sides, and a rear center cutout section 40a4 formed between inner side ends of the left and right rearward-inclined side sections 40a3. A fixed-side opening section 37 that forms a substantially rectangular opening 37b that aligns the split body 40 is provided in the fixed body 30. In a state in which the split body 40 is attached to the fixed-side opening section 37, the fixed body 30 and the split body 40 are disposed such that front surfaces that constitute the bottom surface 26a are flush with or parallel to each other. When the reflected wave-reducing structure 25 is provided on the side surfaces 27a of the lens hood 21, the split body 40 including a part of the side surface-forming section 27 may be provided.

When seen from the height direction Z1, a split section P1 between the fixed body 30 and the split body 40 in the bottom surface-forming section 26 divides the bottom surface 26a and the bottom surface-forming section 26 into a first range H1 including the optical axis CL3 in the surface width direction X1 and a second range H2 that does not include the optical axis CL3 (avoids the optical axis CL3 in the surface width direction X1). The first range H1 is constituted by the split body 40 inside the bottom surface 26a and the bottom surface-forming section 26 in the surface width direction X1. The second range H2 is constituted by the fixed body 30 outside the bottom surface 26a and the bottom surface-forming section 26 in the surface width direction X1. The first range H1 (a front surface of the split body 40) is disposed closer to the optical axis CL3 than the second range H2 (a front surface of the fixed body 30) in the height direction Z1.

The external field-detecting camera 10 is attached to the bottom surface-forming section 26 on the side of the fixed body 30 (the side of the back surface 26b). In the external field-detecting camera 10, a first sensor-fixed section 15 protrudes forward from a left side of a front end portion of the main body section 11, and a second sensor-fixed section 16 protrudes forward from a right side of a front end portion of the main body section 11. In the back surface 26b of the bottom surface-forming section 26, a first sensor-fixing section 35 corresponding to the first sensor-fixed section 15 protrudes downward from a left side of the fixed-side opening section 37, and a second sensor-fixing section 36 corresponding to the second sensor-fixed section 16 protrudes downward from a right side of the fixed-side opening section 37.

The first sensor-fixed section 15 and the second sensor-fixed section 16 move rearward along the back surface 26b of the bottom surface-forming section 26 with respect to the first sensor-fixing section 35 and the second sensor-fixing section 36 and are inserted thereinto (while moving rearward). Accordingly, the first sensor-fixed section 15 and the second sensor-fixed section 16 are being engaged with the first sensor-fixing section 35 and the second sensor-fixing section 36 in a non-fastening state. "The non-fastening state" of the embodiment means that members are fastened without using a fastening member such as a bolt, a nut, or the like. Further, this may be substituted with a configuration coupled using a fastening member. When the external field-detecting camera 10 bridges between the first sensor-fixing section 35 and the second sensor-fixing section 36, a decrease in rigidity of the fixed body 30 is minimized by providing the fixed-side opening section 37.

A third sensor-fixed section 17 is provided on a lateral central section of a rear end portion 11a of the main body section 11 of the external field-detecting camera 10. In the back surface 26b of the bottom surface-forming section 26, a third sensor-fixing section 39 corresponding to the third sensor-fixed section 17 is provided behind the fixed-side opening section 37. The third sensor-fixed section 17 is elastically engaged with the third sensor-fixing section 39 as the rear end portion 11a of the main body section 11 moves to approach the bottom surface-forming section 26 from below. Accordingly, the third sensor-fixed section 17 and the third sensor-fixing section 39 are engaged with each other in a non-fastening state.

The external field-detecting camera 10 is attached to the fixed body 30 of the camera bracket 20 through engagement between the sensor-fixed sections 15 to 17 and the sensor-fixing sections 35, 36 and 39. The external field-detecting camera 10 overlaps the split body 40 when seen in a plan view.

Figure 5:
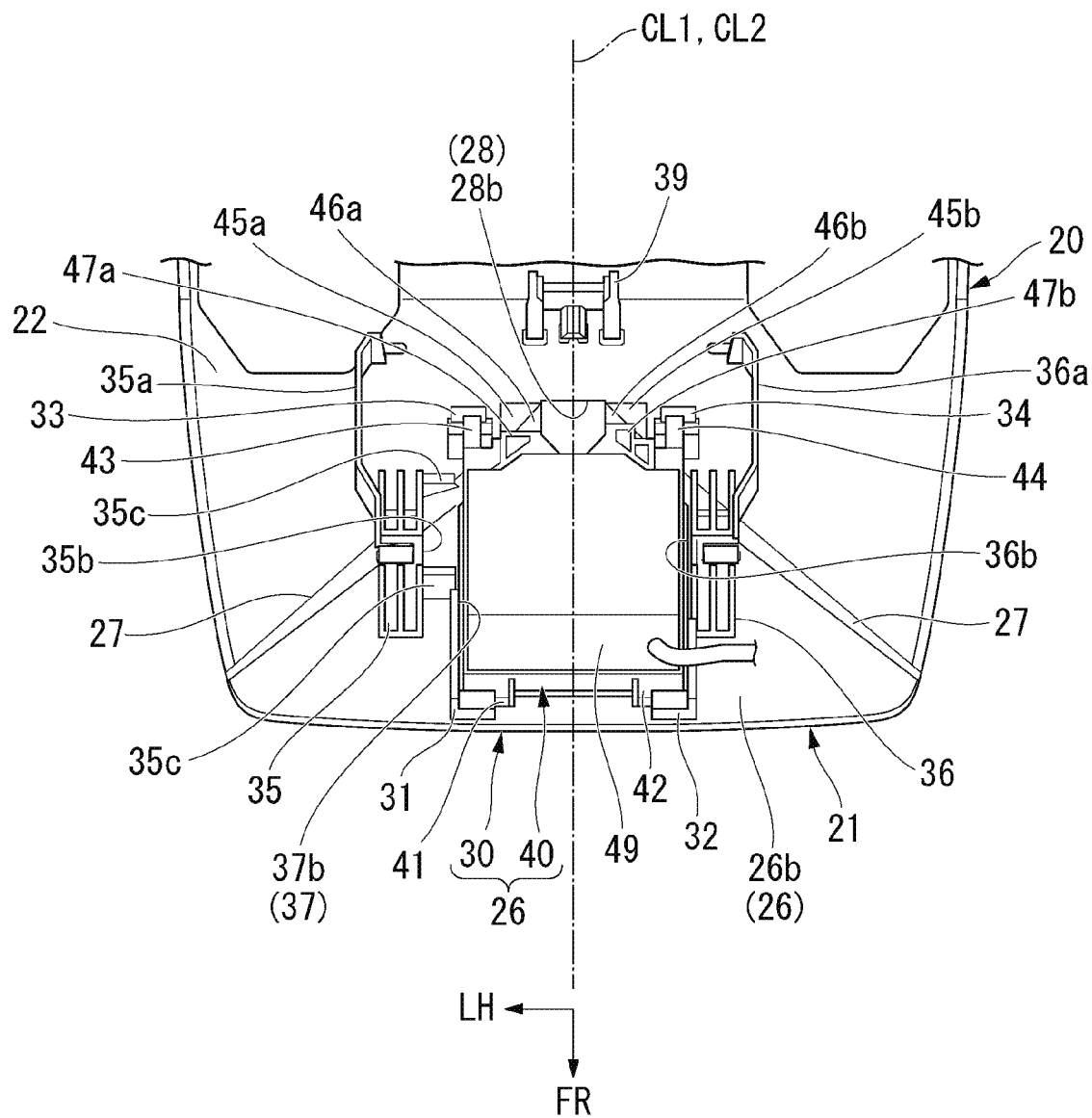
FIG. 5 is a plan view of a state in which the external field-detecting camera is removed from FIG. 4.
Figure 6:
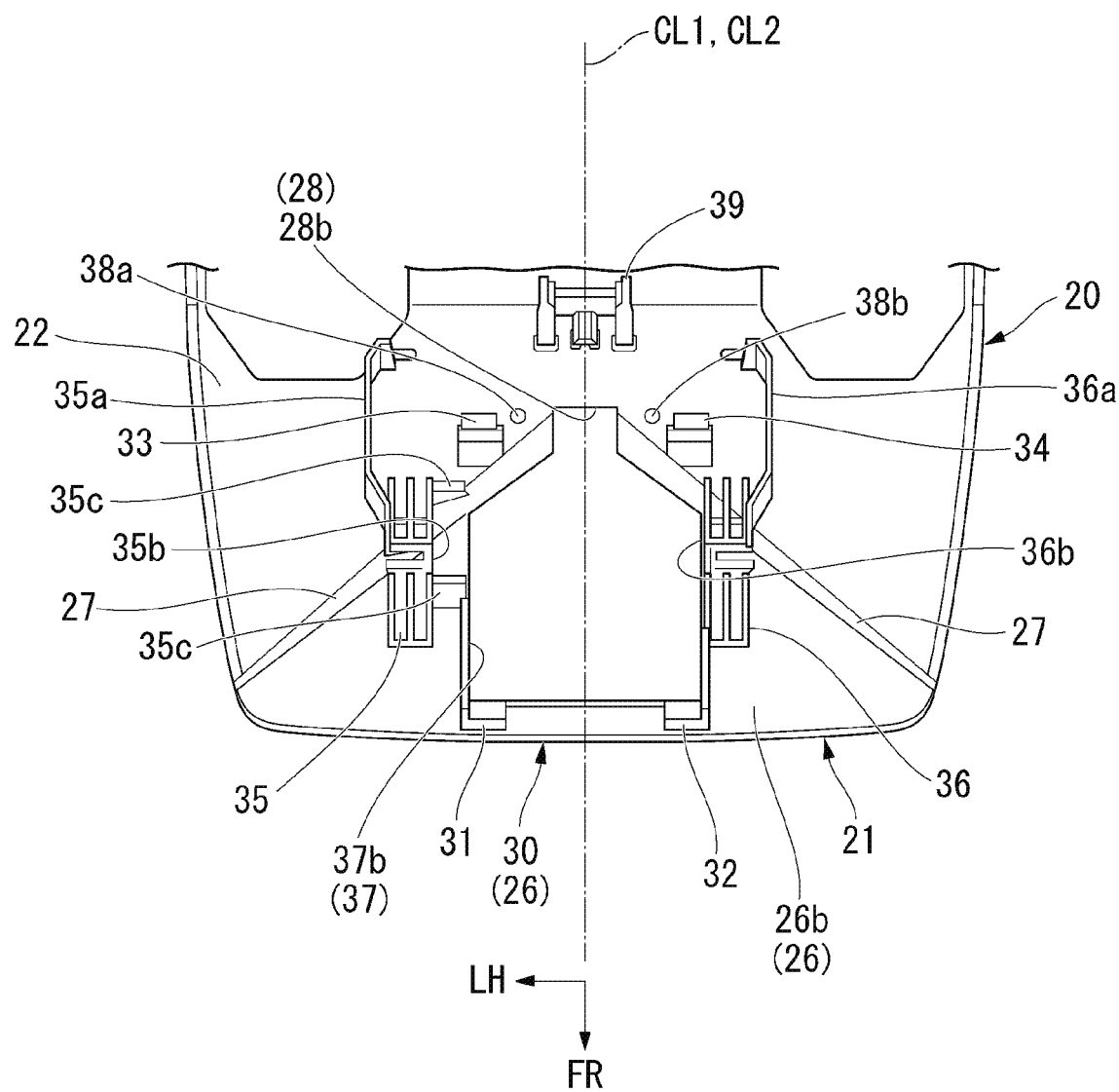
FIG. 6 is a plan view of a state in which a split body is removed from FIG. 5.

FIG. 5 is a plan view of a state in which the external field-detecting camera 10 is removed from FIG. 4, and FIG. 6 is a plan view of a state in which the split body 40 is removed from FIG. 5.

As shown in FIG. 4 to FIG. 6, in the back surface (the back surface 26b) of the camera bracket 20, a first rearward extension wall section 35a and a second rearward extension wall section 36a extending along left and right side sections of the main body section 11 of the external field-detecting camera 10 stand up behind the first sensor-fixing section 35 and the second sensor-fixing section 36. The first rearward extension wall section 35a and the second rearward extension wall section 36a stand up in an overlapping direction (a stacking direction) of the front window glass 3, the fixed body 30 and the external field-detecting camera 10. The first rearward extension wall section 35a and the second rearward extension wall section 36a function as a guide upon attachment of the external field-detecting camera 10. The main body section 11 of the external field-detecting camera 10 is slightly asymmetrical, and thus, disposition of the first sensor-fixing section 35 and the second sensor-fixing section 36 is also slightly asymmetrical.

A first wall section 35b and a second wall section 36b extending in the vehicle forward/rearward direction are provided on left and right inner side portions of the first sensor-fixing section 35 and the second sensor-fixing section 36, respectively. The first wall section 35b and the second wall section 36b also stand up in the stacking direction. The first wall section 35b and the second wall section 36b function as a guide upon attachment of the split body 40. For example, a pair of front and rear ribs 35c are provided on left and right inner sides of the first wall section 35b. The front and rear ribs 35c causes the left and right inner side ends to approach a left side edge of the split body 40, and the front and rear ribs 35c become an attachment guide of a left side of the split body 40.

Figure 7:
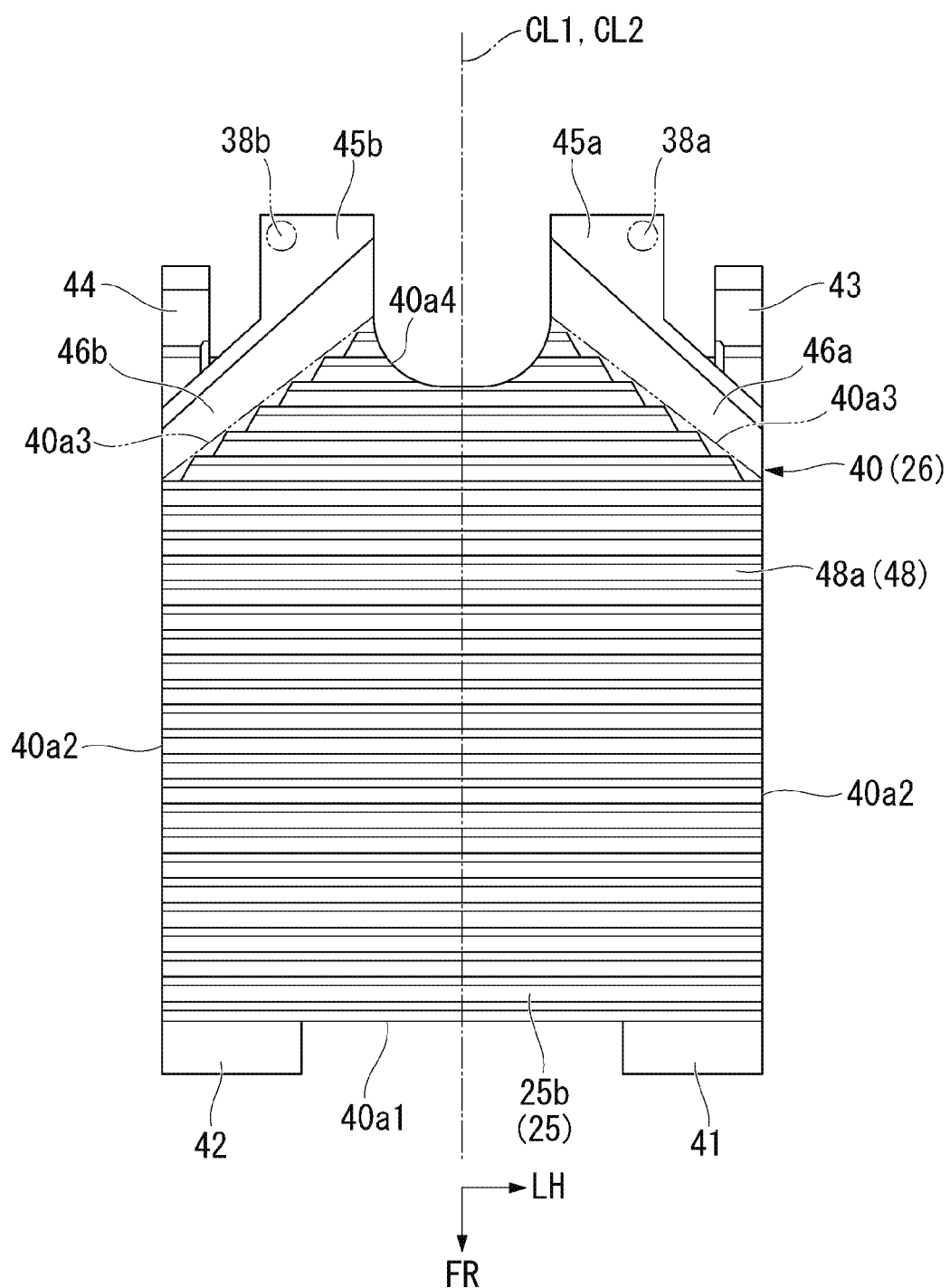
FIG. 7 is a plan view showing the split body from the front surface side.
Figure 8:
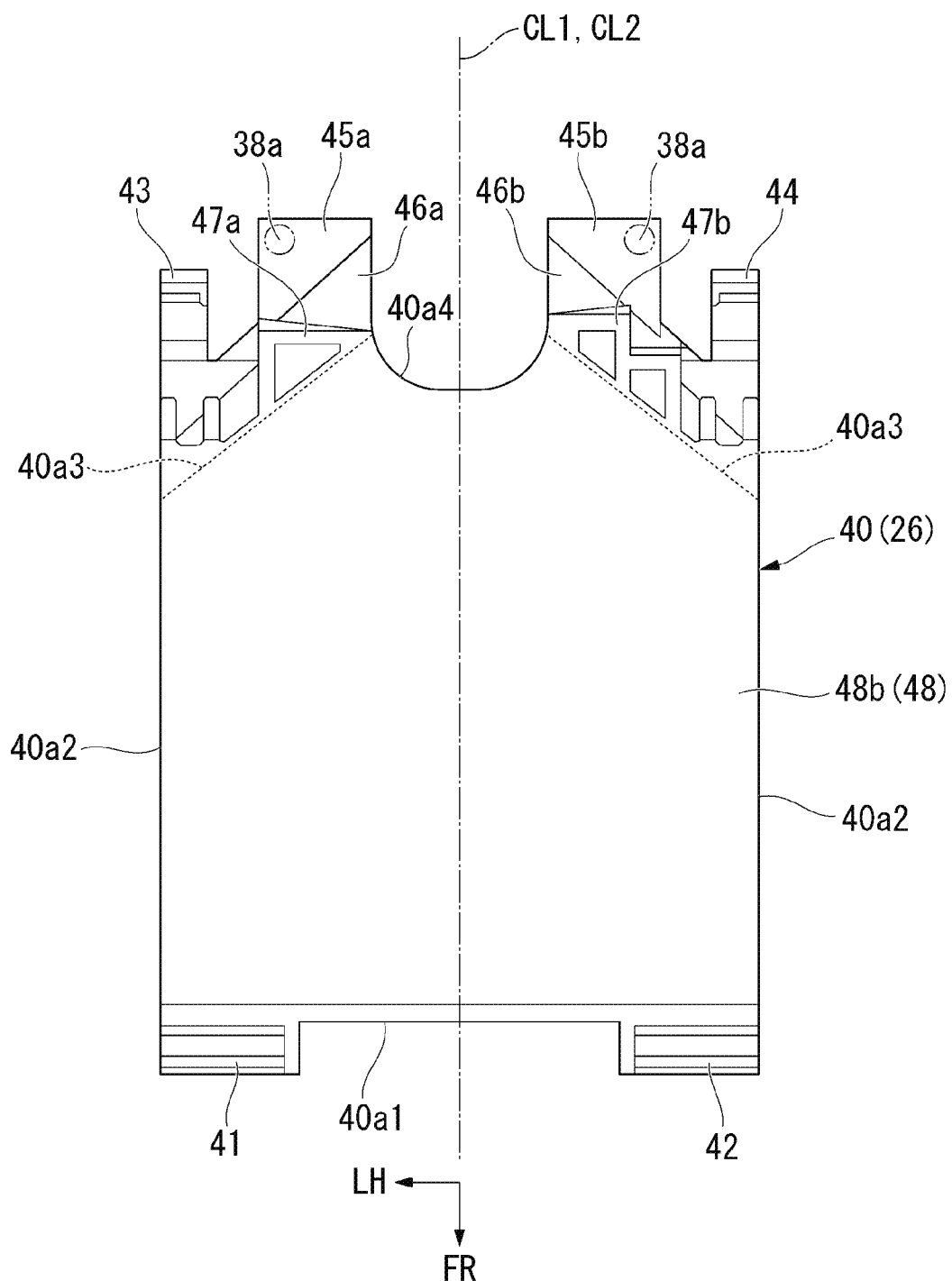
FIG. 8 is a plan view showing the split body from the back surface side.

FIG. 7 is a plan view showing the split body 40 from a front surface side (a front surface 48a side of the flat plate section 48, the bottom surface 26a side), and FIG. 8 is a plan view showing the split body 40 from a back surface side (a back surface 48b side of the flat plate section 48, the back surface 26b side).

Referring to FIG. 7 and FIG. 8, the split body 40 includes the flat plate section 48 having the reflected wave-reducing structure 25 on a side surface (the front surface 48a) in the thickness direction. The flat plate section 48 includes the front side section 40a1, the left and right side sections 40a2, the left and right rearward-inclined side sections 40a3 and the rear center cutout section 40a4 on an outer circumferential section (an outer circumferential section 40a of the split body 40) when seen in a plan view.

The front side section 40a1 is formed on a front end portion of the flat plate section 48, and extends in the vehicle leftward/rightward direction when seen in a plan view.

The left and right side sections 40a2 are formed in left and right side end portions of a flat plate body, and extend in the vehicle forward/rearward direction when seen in a plan view.

The left and right rearward-inclined side sections 40a3 are formed on left and right rear end portions of a flat plate body, and are inclined and expand to be disposed forward as they go outward on left and right sides when seen in a plan view.

The rear center cutout section 40a4 is formed between inner side ends of the left and right rearward-inclined side sections 40a3 inside left and right sides of a rear section of the split body 40, and has a semi-circular shape protruding forward when seen in a plan view.

A first fixed section 41 and a second fixed section 42 protrude forward from left and right side sections of the front side section 40a1. In the back surface 26b of the bottom surface-forming section 26, a first fixing section 31 and a second fixing section 32 corresponding to the first fixed section 41 and the second fixed section 42 protrude downward in front of the fixed-side opening section 37. The first fixed section 41 and the second fixed section 42 move forward along the back surface 26b of the bottom surface-forming section 26 and are inserted into the first fixing section 31 and the second fixing section 32. Accordingly, the first fixed section 41 and the second fixed section 42 are engaged with the first fixing section 31 and the second fixing section 32 in a non-fastening state.

Here, the first fixed section 41 and the second fixed section 42 that are fixed sections on the side of the split body 40 are formed to be weaker than the first fixing section 31 and the second fixing section 32 that are fixing sections on the side of the fixed body 30. That is, the first fixed section 41 and the second fixed section 42 are formed weakly by at least one of, for example, provision of a thin wall section, a notch, or the like, or formation of the first fixing section 31 and the second fixing section 32 using different materials. Accordingly, when the split body 40 is removed from the fixed body 30 or the like, even in the case in which a failure occurs to an extent of a fixing portion thereof, the side of the fixed body 30 can be protected by breaking the side of the split body 40.

A first protrusion wall section 46a and a second protrusion wall section 46b stand up from the left and right rearward-inclined side sections 40a3 toward the front surface 48a of the flat plate section 48. The protrusion wall sections 46a and 46b are formed to be bent upward and rearward and stand up from a rearward inclined side section 40a3. The protrusion wall sections 46a and 46b are disposed to overlap the left and right side surface-forming sections 27 of the fixed body 30 on back sides thereof. The protrusion wall sections 46a and 46b form a standing tip portion substantially parallel to the rearward inclined side section 40a3 when seen in a plan view. The protrusion wall sections 46a and 46b are formed to be inclined with respect to a direction perpendicular to the front surface 48a of the flat plate section 48 and substantially parallel to the side surface-forming section 27. The protrusion wall sections 46a and 46b are formed along inner side ends of left and right inner sides in the vehicle forward/rearward direction when seen in a plan view. The inner side ends of the protrusion wall sections 46a and 46b are continuous with left and right front ends of the rear center cutout section 40a4.

A first elastic deformation piece 45a and a second elastic deformation piece 45b substantially parallel to the front surface 48a of the flat plate section 48 protrude reward and outward on left and right sides on left and right inner sides of standing tip portions of the protrusion wall sections 46a and 46b. Each of the elastic deformation pieces 45a and 45b is formed in a triangular shape when seen in a plan view, and has a rear side section extending in the vehicle leftward/rightward direction when seen in a plan view, and an outer side section extending in the vehicle forward/rearward direction when seen in a plan view. The inner side ends of the elastic deformation pieces 45a and 45b are continuous with the inner side ends of the protrusion wall sections 46a and 46b, and are formed in a linear shape in the vehicle forward/rearward direction when seen in a plan view to reach left and right front ends of the rear center cutout section 40a4.

In the back surface 26b of the bottom surface-forming section 26, a first protrusion section 38a and a second protrusion section 38b corresponding to the elastic deformation pieces 45a and 45b protrude behind the fixed-side opening section 37. The elastic deformation pieces 45a and 45b are pressed against the protrusion sections 38a and 38b of the fixed body 30 to the side away from the fixed body 30. Accordingly, engagement of a third fixed section 43 and a fourth fixed section 44 with a third fixing section 33 and a fourth fixing section 34, which will be described below, is increased, and a rear end portion of the split body 40 is strongly fixed to the fixed body 30 with no rattling.

The third fixed section 43 and the fourth fixed section 44 protrude rearward from left and right outer sides of standing tip portions of the protrusion wall sections 46a and 46b at intervals on left and right outer sides of the elastic deformation pieces 45a and 45b. In the back surface 26b of the bottom surface-forming section 26, the third fixing section 33 and the fourth fixing section 34 corresponding to the third fixed section 43 and the fourth fixed section 44 protrude downward behind the fixed-side opening section 37. The third fixed section 43 and the fourth fixed section 44 are elastically engaged with the third fixing section 33 and the fourth fixing section 34 as the rear end portion of the split body 40 approaches the fixed body 30 from below. Accordingly, the third fixed section 43 and the fourth fixed section 44 are engaged with the third fixing section 33 and the fourth fixing section 34 in a non-fastening state.

Since the third fixed section 43 and the fourth fixed section 44 are separated from the elastic deformation pieces 45a and 45b at an interval, it is difficult for elastic deformation of one of them to affect elastic deformation of the other.

Here, the third fixed section 43 and the fourth fixed section 44 are also formed to be weaker than the third fixing section 33 and the fourth fixing section 34 corresponding thereto. Accordingly, even when damage occurs when the split body 40 is removed from the fixed body 30 or the like, the side of the fixed body 30 can be protected by breaking the side of the split body 40.

A first pressing section 47a and a second pressing section 47b that form a pressing surface flush with the back surface 48b of the flat plate section 48 protrude from the protrusion wall sections 46a and 46b on the back surface side. The pressing sections 47a and 47b overhang rearward from the back surfaces of the protrusion wall sections 46a and 46b, and form a pressing surface having a triangular shape or the like in front of the elastic deformation pieces 45a and 45b when seen in a plan view. Weight-reducing recess sections that open toward the back surface 48b are appropriately formed in the pressing sections 47a and 47b. The pressing sections 47a and 47b are slightly asymmetrical with each other. Except for the pressing sections 47a and 47b, the split body 40 is configured symmetrically. While the external field-detecting camera 10 and the camera bracket 20 tend to be asymmetrical when used in different vehicle type or sensor arrangements, diversion is facilitated as long as the split body 40 is symmetrical.

Here, the elastic deformation pieces 45a and 45b and the pressing sections 47a and 47b are disposed closer to the third fixed section 43 and the fourth fixed section 44 than the first fixed section 41 and the second fixed section 42. Accordingly, if the pressing sections 47a and 47b are pressed when the split body 40 is attached to the fixed body 30, the third fixed section 43 and the fourth fixed section 44 are easily engaged with the fixed body 30, and the elastic deformation pieces 45a and 45b are easily elastically deformed. For example, a sheet-shaped heater 49 is attached to the back surface 48b of the split body 40. A functional part attached to the split body 40 is not limited to the heater 49 and may be, for example, an interior lamp, a car speaker, or the like.

<With Respect to Gap in Reflected Wave-Reducing Structure>

FIG. 10(a) is a cross-sectional view along line A-A in FIG. 9, showing a first example of an overlapping structure of the split body 40 and the fixed body 30. FIG. 10(b) is an enlarged view of a portion Xb in FIG. 10(a).

When a gap occurs between the outer circumferential section 40a of the split body 40 and an inner circumferential section 37a of the fixed-side opening section 37, light enters the lens hood 21 from the gap to become stray radiation, and detection accuracy of the external field-detecting camera 10 will be affected.

As shown in FIG. 10(a), in the embodiment, overlapping (an overlapping margin R1) occurs between the outer circumferential section 40a of the split body 40 and the inner circumferential section 37a of the fixed-side opening section 37 in a direction along the back surface 26b of the bottom surface-forming section 26. That is, the outer circumferential section 40a of the split body 40 includes an overlapping section 40b that overlaps the inner circumferential section 37a of the fixed-side opening section 37 from the side of the back surface 26b of the bottom surface-forming section 26.

In an example of FIG. 10(a), the outer circumferential section 40a of the split body 40 and the inner circumferential section 37a of the fixed-side opening section 37 have stepped cross-sectional shapes that are meshed with each other. "The stepped cross-sectional shapes that are meshed with each other" is a cross-sectional shape in which, when the split body 40 is fitted into the fixed-side opening section 37 from the back surface 26b side, a position of the split body 40 is defined in the direction perpendicular to the back surface 26b of the bottom surface-forming section 26, and a front surface including the split-side structure section 25b of the split body 40 is disposed parallel to a front surface including the fixed-side structure section 25a of the fixed body 30. In the direction along the back surface 26b of the bottom surface-forming section 26, a gap is formed around the split body 40, and the split body 40 is easily fitted into the fixed-side opening section 37 by allowing a component tolerance or the like thereof.

Referring to FIG. 10(b), the outer circumferential section 40a of the split body 40 and the inner circumferential section 37a of the fixed-side opening section 37 include a first direction abutting surface 37s1 that is able to abut the other in the direction perpendicular to the bottom surface 26a (the height direction Z1), and a second direction abutting surface 37s2 that is able to abut the other in the direction along the bottom surface 26a (the surface width direction X1 and the surface forward/rearward direction Y1). Further, for the convenience of illustration, illustration of the second direction abutting surface 37s2 that is able to abut in the surface forward/rearward direction Y1 will be omitted.

Accordingly, when the split body 40 is fitted into the fixed-side opening section 37, since a position of the split body 40 is defined in the direction crossing the bottom surface 26a of the bottom surface-forming section 26 by the first direction abutting surface 37s1 and a position of the split body 40 is defined in the direction along the bottom surface 26a of the bottom surface-forming section 26 by the second direction abutting surface 37s2, attachment of the split body 40 is facilitated.

Shapes of the first direction abutting surface 37s1 (and the second direction abutting surface 37s2) that can abut each other in the outer circumferential section 40a of the split body 40 and the inner circumferential section 37a of the fixed-side opening section 37 are not limited, and for example, an arc-shaped convex surface may be in point contact or line contact therewith. The first direction abutting surface 37s1 (and the second direction abutting surface 37s2) that are able to abut each other is not limited to a configuration of direct abutting and may have a configuration of indirect abutting via a seal member or the like. A configuration in which the split body 40 is fixed in a state in which a gap is provided between the first direction abutting surface 37s1 (and the second direction abutting surface 37s2) that are able to abut each other may be provided. In this case, even if the position of the split body 40 is shifted by the extent corresponding to the gap in the direction along the bottom surface 26a, overlapping (the overlapping margin R1) may occur between the outer circumferential section 40a of the split body 40 and the inner circumferential section 37a of the fixed-side opening section 37 when seen from the height direction Z1.

FIG. 11(a) is a cross-sectional view along line A-A in FIG. 9, showing a second example of an overlapping structure between the split body 40 and the fixed body 30. FIG. 11(b) is an enlarged view of a portion XIb in FIG. 11(a).

Figure 11:
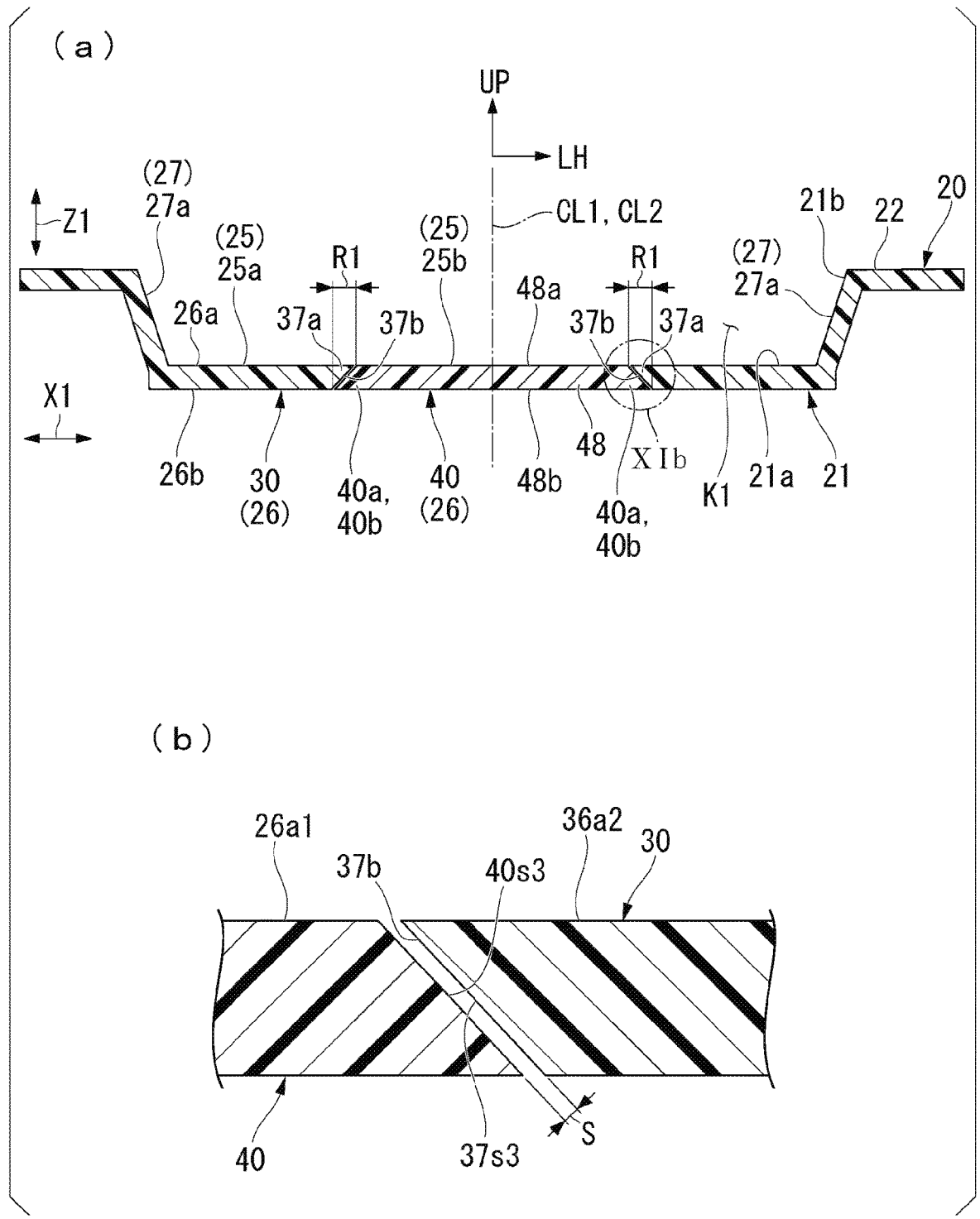
FIG. 11(a) is a cross-sectional view along line A-A in FIG. 9
FIG. 11(b) is an enlarged view of a portion XIb in FIG. 11(a), showing a second example of the overlapping structure of the split body and the fixed body.

A cross-sectional shape in which overlapping occurs between the outer circumferential section 40a of the split body 40 and the inner circumferential section 37a of the fixed-side opening section 37 is not limited to the stepped cross-sectional shape, and for example, as shown in FIG. 11, may be an inclined cross-sectional shape in which the outer circumferential section 40a of the split body 40 and the inner circumferential section 37a of the fixed-side opening section 37 are matched with each other. Even in this case, overlapping R1 is generated between the outer circumferential section 40a of the split body 40 and the inner circumferential section 37a of the fixed-side opening section 37 in the direction along the back surface 26b of the bottom surface-forming section 26. That is, the outer circumferential section 40a of the split body 40 includes the overlapping section 40b that overlaps the inner circumferential section 37a of the fixed-side opening section 37 from the side of the back surface 26b of the bottom surface-forming section 26.

Referring to FIG. 11(b), the outer circumferential section 40a of the split body 40 and the inner circumferential section 37a of the fixed-side opening section 37 include inclined surfaces 37s3 and 40s3 inclined to be disposed closer to an outer circumferential side of the fixed-side opening section 37 as it goes toward the back surface 26b of the bottom surface-forming section 26 and overlapping the other in the direction along the bottom surface 26a (the surface width direction X1 and the surface forward/rearward direction Y1). Further, for the convenience of illustration, illustration of the inclined surfaces 37s3 and 40s3 overlapping in the surface forward/rearward direction Y1 will be omitted.

Accordingly, the inner circumferential section 37a of the fixed-side opening section 37 is formed to be wider toward the back surface 26b (an outer side of the lens hood 21), and the outer circumferential section 40a of the split body 40 is formed to be narrower toward the bottom surface 26a (an inner side of the lens hood 21). For this reason, the split body 40 is easily fitted into the fixed-side opening section 37 from the outer side of the lens hood 21, and the split body 40 is guided to a prescribed position along the inclined surfaces 37s3 and 40s3. When the inclined surfaces 37s3 and 40s3 abut directly or indirectly each other, a position of the split body 40 is prescribed in both of the direction crossing the bottom surface 26a of the bottom surface-forming section 26 and the direction along the bottom surface 26a, and in this respect, attachment of the split body 40 is facilitated.

The embodiment is not limited to the configuration in which both of the outer circumferential section 40a of the split body 40 and the inner circumferential section 37a of the fixed-side opening section 37 include the inclined surfaces, and may have a configuration in which one has an end surface in the height direction Z1 (a plate thickness direction) and only the other has an inclined surface. As shown in the drawings, a configuration in which the split body 40 is fixed in a state in which a gap s is provided between the inclined surfaces that are able to abut each other may be provided. In this case, even if the position of the split body 40 is shifted to an extent corresponding to the gap s in the direction along the bottom surface 26a, when seen from the height direction Z1, the overlapping (the overlapping margin R1) may occur between the outer circumferential section 40a of the split body 40 and the inner circumferential section 37a of the fixed-side opening section 37. In addition, a configuration in which the split body 40 is fixed while the inclined surfaces abut each other may be provided.

Figure 10:
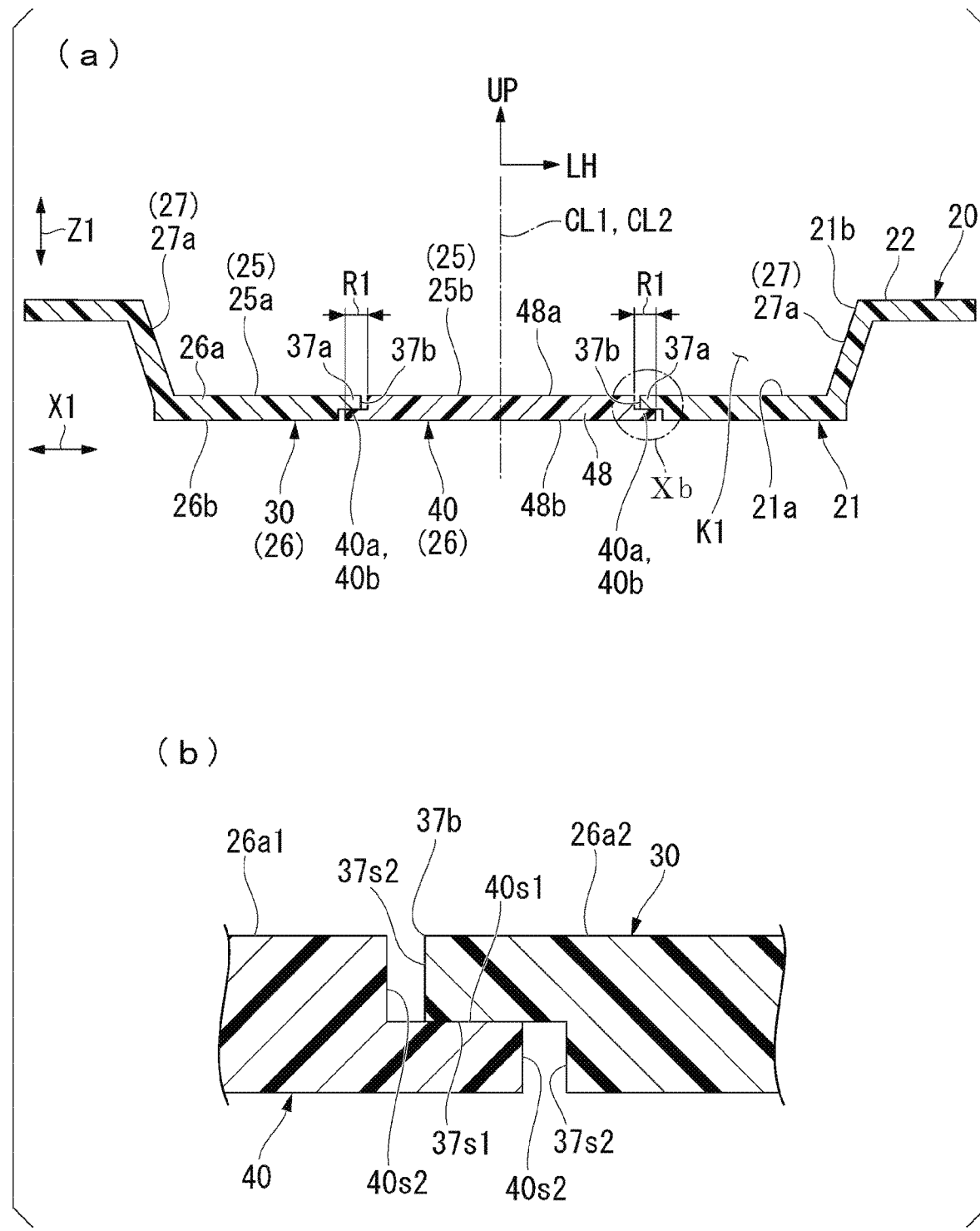
FIG. 10(a) is a cross-sectional view along line A-A in FIG. 9
FIG. 10(b) is an enlarged view of a portion Xb in FIG. 10(a), showing a first example of an overlapping structure of the split body and the fixed body.

In an example in FIG. 10 and FIG. 11, an edge of the fixed-side opening section 37 above the bottom surface 26a is disposed further inside the fixed-side opening section 37 than an edge of the split body 40 above the back surface 26b. The overlapping structure of the split body 40 and the fixed body 30 is not limited to the example in FIG. 10 and FIG. 11 as long as the condition is satisfied. In this way, even when the reflected wave-reducing structure 25 is provided as a split structure by being disposed between the split body 40 and the fixed body 30 so as not to generate a gap in a surface-along direction along the front surface (the bottom surface 26a) including the reflected wave-reducing structure 25, intrusion of light into the lens hood 21 is minimized.

<With Respect to Step Difference of Reflected Wave-Reducing Structure>

FIG. 12(a) is a view for description corresponding to a cross section along line A-A in FIG. 9, and FIG. 12(b) is a perspective view around the split section P1.

As shown in FIG. 12(a) and FIG. 12(b), in the case in which a part of the camera bracket 20 is provided as a detachable split body 40, when the split body 40 is sunk toward an inner side of the lens hood 21 in the fixed-side opening section 37 due to an influence of a gap between the split body 40 and the fixed-side opening section 37, a tolerance and a positional deviation of related parts, or the like, a step difference occurs in the bottom surface 26a including the reflected wave-reducing structure 25. When a stepped surface D1 formed by the step difference (an outer circumferential surface of the split body 40, a surface substantially perpendicular to the bottom surface 26a) is directed toward the optical axis CL3 in the direction along the bottom surface 26a, since irregular reflection of light or the like may occur on the side of the lens 12, it is easy to influence the detection accuracy of the external field-detecting camera 10.

In the embodiment, the split body 40 disposed on a front region of the lens 12 (the first range H1 inside in the surface width direction X1) overhangs toward an inner side of the lens hood 21 with respect to the fixed body 30 disposed in the second range H2 outside in the surface width direction X1. Accordingly, even if a component tolerance, a positional deviation, or the like, of the split body 40 is provided, the split-side bottom surface 26a2 is disposed higher than the fixed-side bottom surface 26a1 in the height direction Z1 when seen from an inner side of the lens hood 21. That is, since the split body 40 is not sunk toward the fixed body 30 on the bottom surface 26a, the stepped surface D1 (see FIG. 13(a)) directed toward the optical axis CL3 in the direction along the bottom surface 26a will not appear on the reflected wave-reducing structure 25 (the bottom surface 26a). Accordingly, the occurrence of irregular reflection of light or the like on the side of the lens 12 is minimized by the stepped surface D1.

Figure 13:
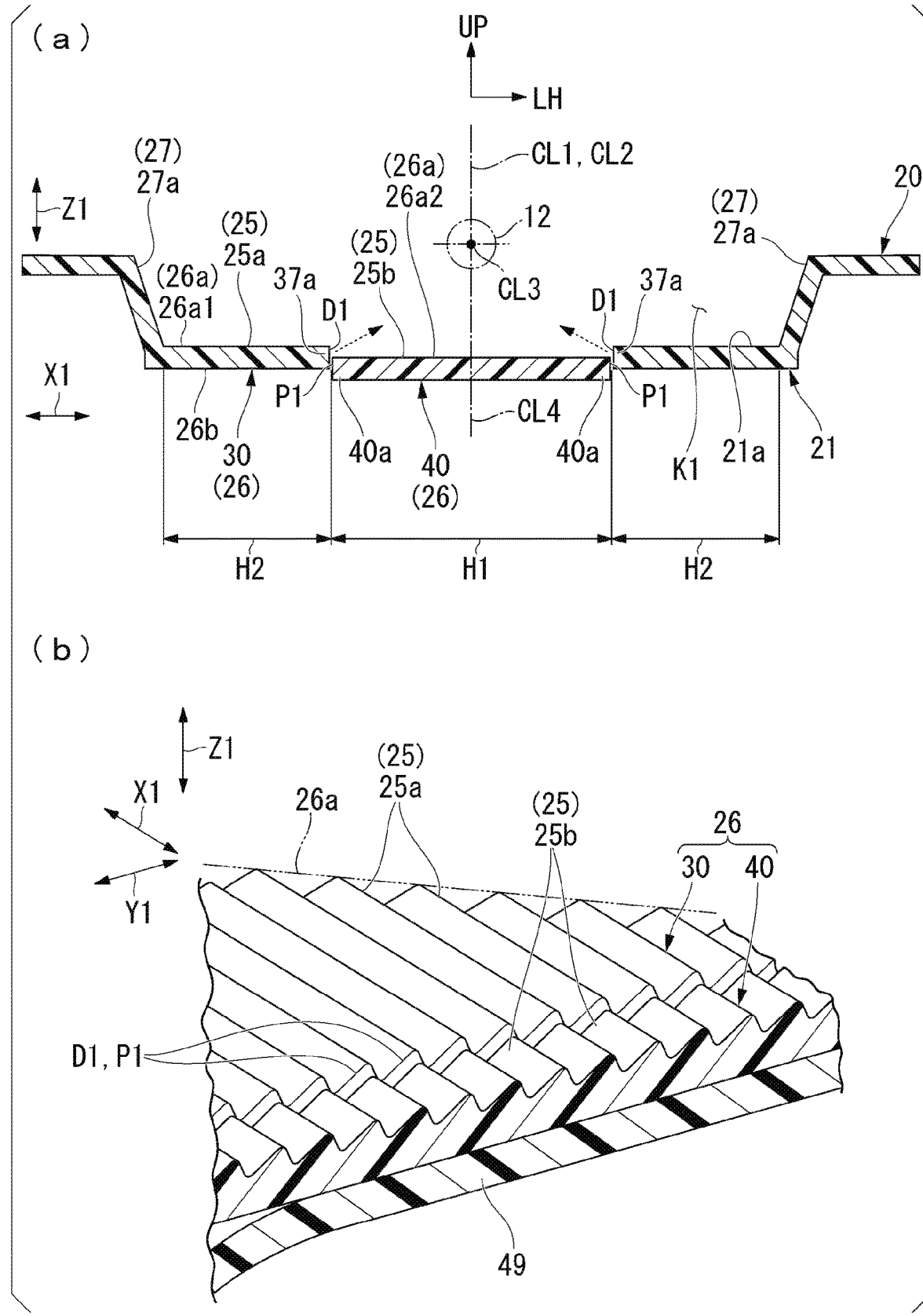
FIG. 13(a) is a view for description corresponding to the cross-sectional view along line A-A in FIG. 9 in a comparative example.
FIG. 13(b) is a perspective view around a split section in the comparative example.

FIG. 13(a) is a view for description corresponding to a cross section along line A-A in FIG. 9 in a comparative example, and FIG. 13(b) is a perspective view around the split section P1 in the comparative example.

In the example shown in FIG. 13(a) and FIG. 13(b), the fixed-side bottom surface 26a1 is disposed higher than the split-side bottom surface 26a2 when seen from an inner side of the lens hood 21, and the stepped surface D1 therebetween is exposed to the side of the lens 12 (the side of the first range H1). Accordingly, irregular reflection of light or the like toward the lens 12 may occur due to the stepped surface D1.

Here, when the split-side bottom surface 26a2 and the fixed-side bottom surface 26a1 have the same height, since the stepped surface does not occur therebetween, irregular reflection of light or the like toward the lens 12 is minimized. Meanwhile, in the case in which the reflected wave-reducing structure 25 has a projecting or indented pattern form such as a wave pattern form or the like, even if the split-side bottom surface 26a2 and the fixed-side bottom surface 26a1 have the same height, when they are shifted to each other to an extent of a half pitch of the projecting or indented pattern form in the direction along the bottom surface 26a, the end surface of the projecting or indented pattern form of the reflected wave-reducing structure 25 on the side of the fixed body 30 appears and causes irregular reflection of light or the like. For this reason, the split-side bottom surface 26a2 is desirably disposed higher than the fixed-side bottom surface 26a1 to a level that exceeds a height extent of the projecting or indented pattern form.

Figure 14:
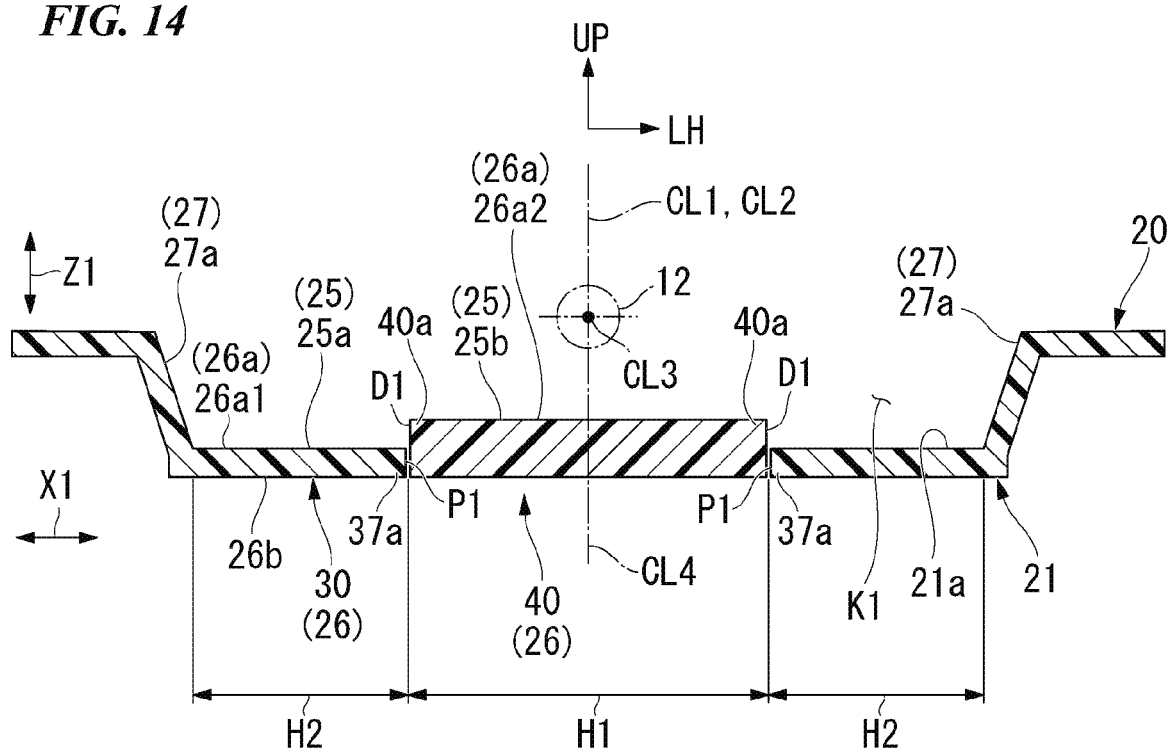
FIG. 14 is a view for describing a variant corresponding to the cross-sectional view along line A-A in FIG. 9.

In the example shown in FIG. 14, the split-side bottom surface 26a2 is disposed higher than the fixed-side bottom surface 26a1 while a plate thickness of the split body 40 is large and the back surfaces of the split body 40 and the fixed body 30 are disposed to be flush with each other. Since the back surfaces of the split body 40 and the fixed body 30 are flush with each other, an effect of enabling easy attachment and detachment of the split body is obtained. Further, since the plate thickness is large, the members overlap and a vibration isolation effect is obtained. In addition, a volume is increased, and thus, a thermal storage effect is obtained.

Figure 15:
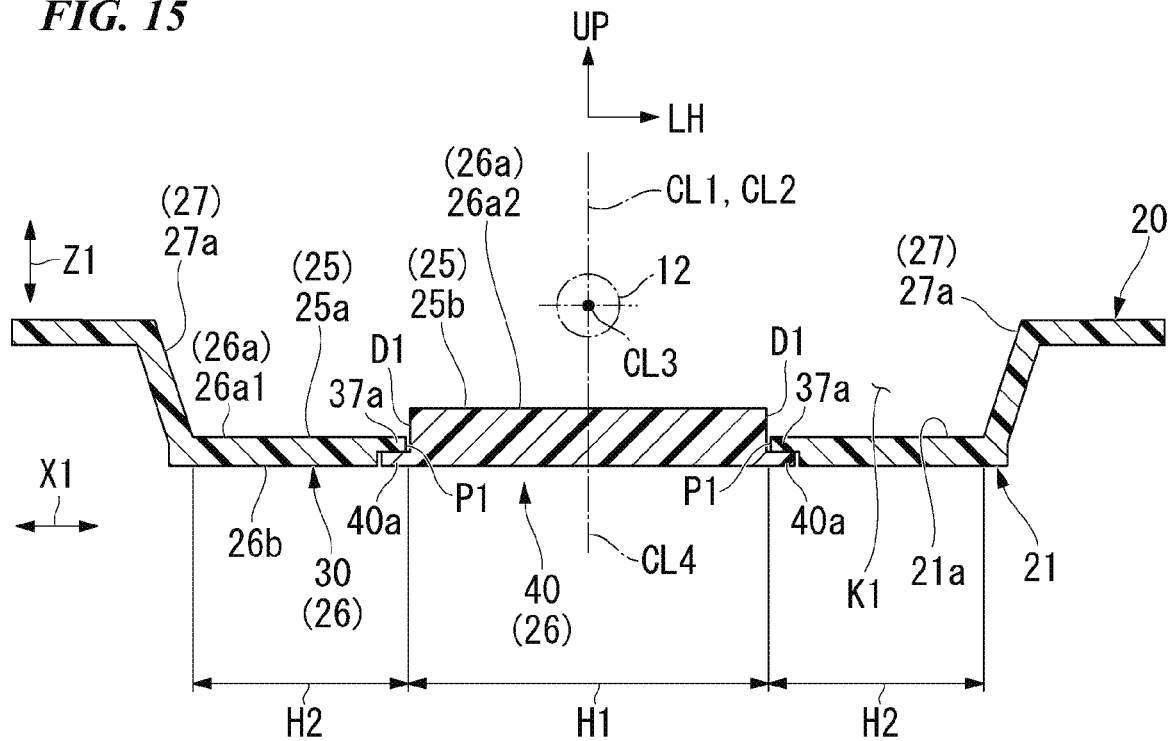
FIG. 15 is a view for describing a variant corresponding to the cross-sectional view along line A-A in FIG. 9.

In the example shown in FIG. 15, unlike the example in FIG. 14, the outer circumferential section 40a of the split body 40 and the inner circumferential section 37a of the fixed-side opening section 37 have a stepped cross-sectional shape in which they are meshed with each other. In other words, the plate thickness of the split body 40 is increased compared to the example in FIG. 10. Since the plate thickness of the split body 40 is increased, the members overlap and a vibration isolation effect is obtained. Further, since the plate thickness is increased, the members overlap and a vibration isolation effect is obtained. In addition, since a volume is increased, a thermal storage effect is obtained.

Figure 16:
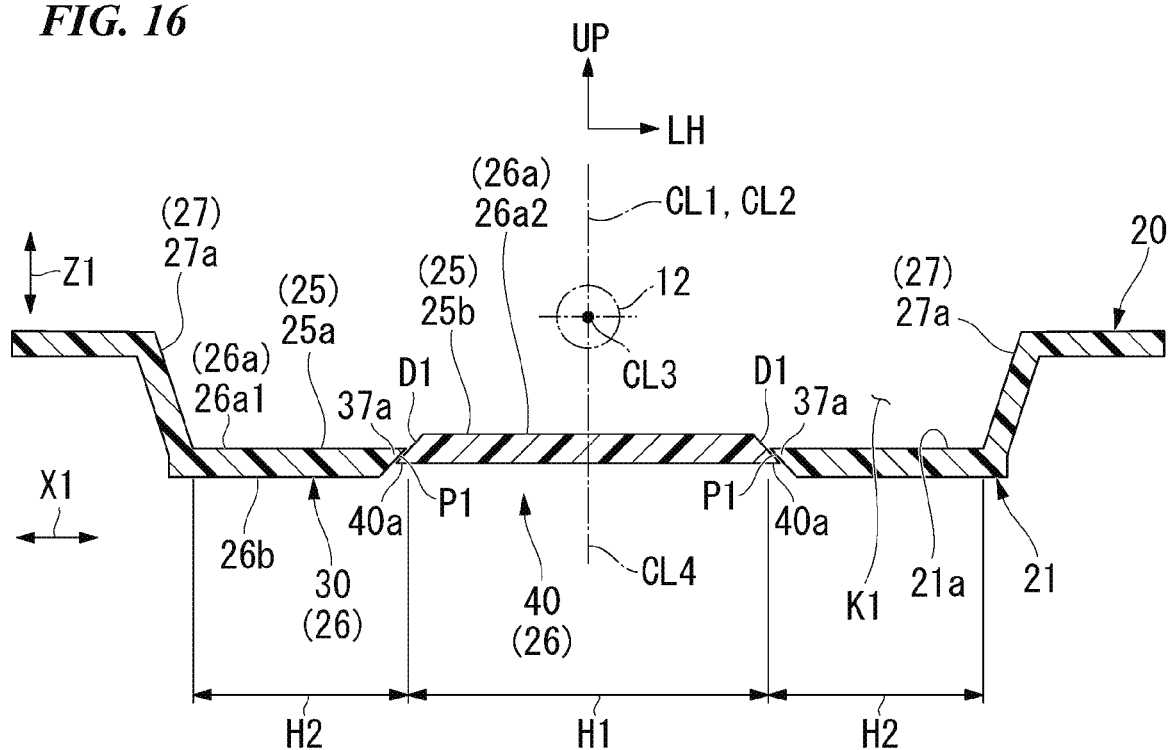
FIG. 16 is a view for describing a variant corresponding to the cross-sectional view along line A-A in FIG. 9.

In the example shown in FIG. 16, unlike the example in FIG. 11, the split body 40 is sunk toward an inner side of the lens hood 21 in the fixed-side opening section 37, and thus, the split body 40 is disposed higher than the fixed body 30 in the height direction Z1. The split body 40 in FIG. 16 is not increasing the plate thickness, and the split body 40 has a recess formed on the side of the back surface and depressed to an extent of a sink inside the lens hood 21. Functional parts such as the heater 49 and the like may be disposed using the recess.

Figure 19:
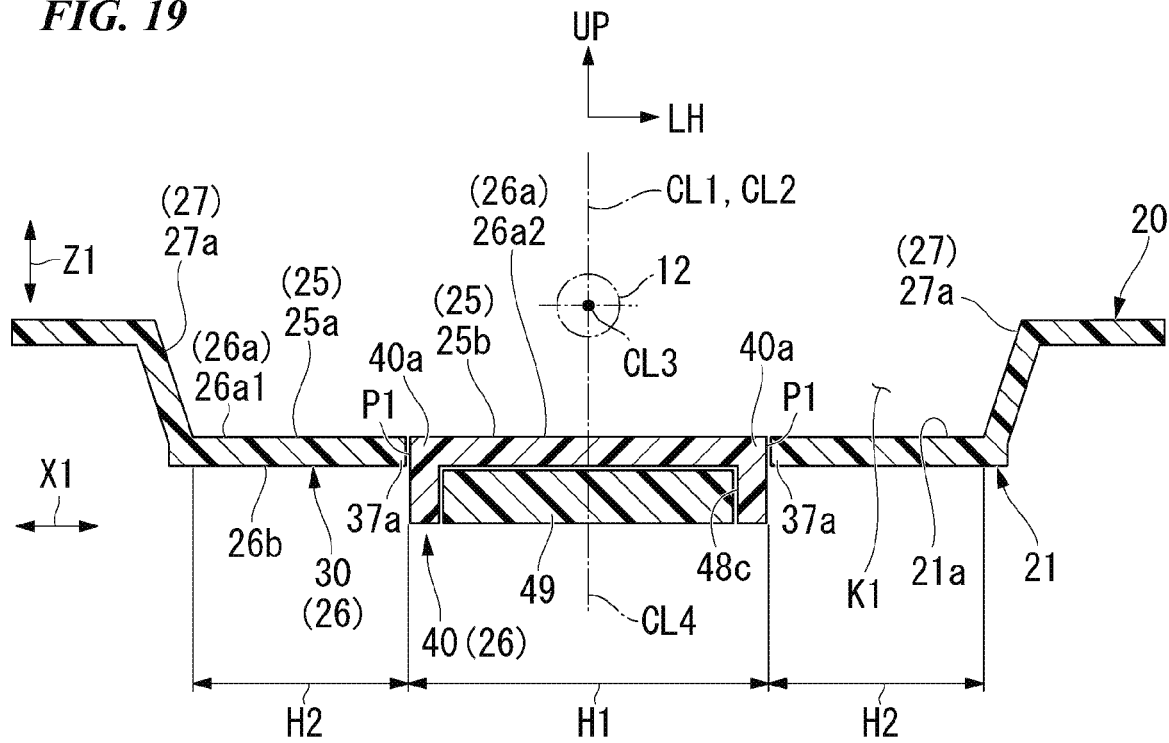
FIG. 19 is a view for describing a variant corresponding to the cross-sectional view along line A-A in FIG. 9.
Figure 20:
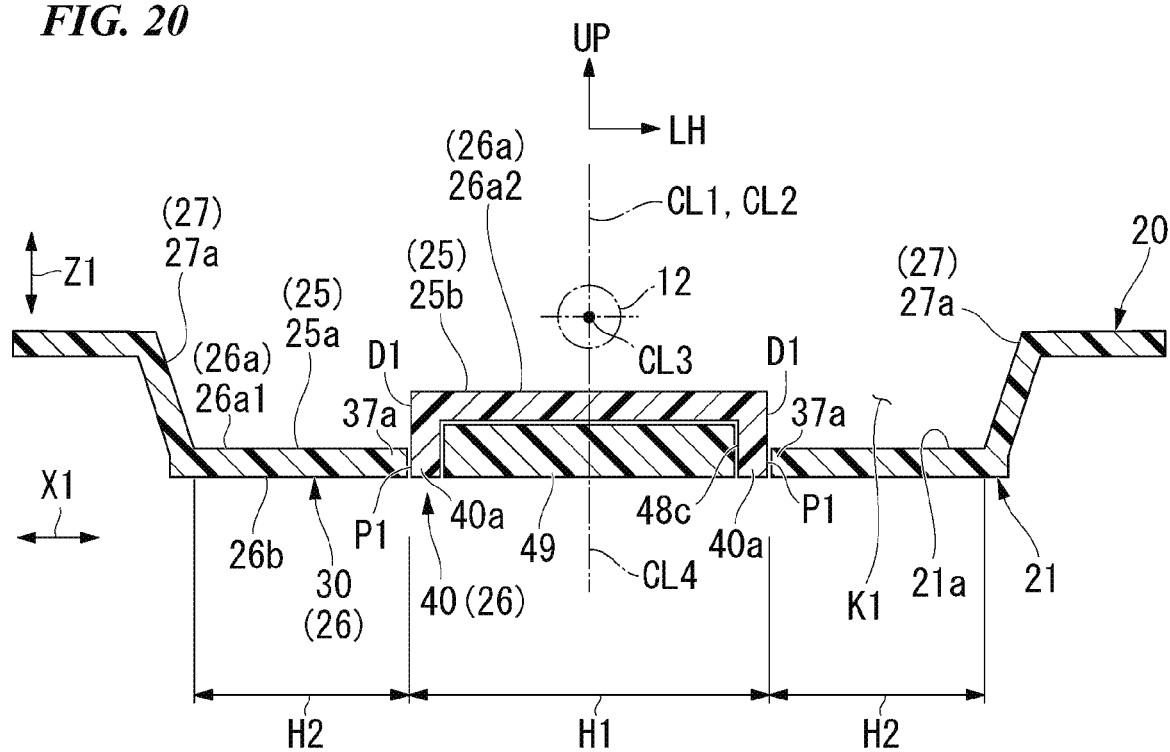
FIG. 20 is a view for describing a variant corresponding to the cross-sectional view along line A-A in FIG. 9.

Meanwhile, in the example shown in FIG. 17 to FIG. 20, since weight reduction is performed on the side of the back surface of the split body 40 having an increased plate thickness, a recess section 48c is formed in the split body 40. In this case, as shown in FIG. 19 and FIG. 20, the recess section 48c can be used as a disposition space of the functional parts such as the heater 49 and the like while the split body 40 as a separate body is reduced in weight and a load of an area to which the split body 40 is attached is minimized.

Figure 17:
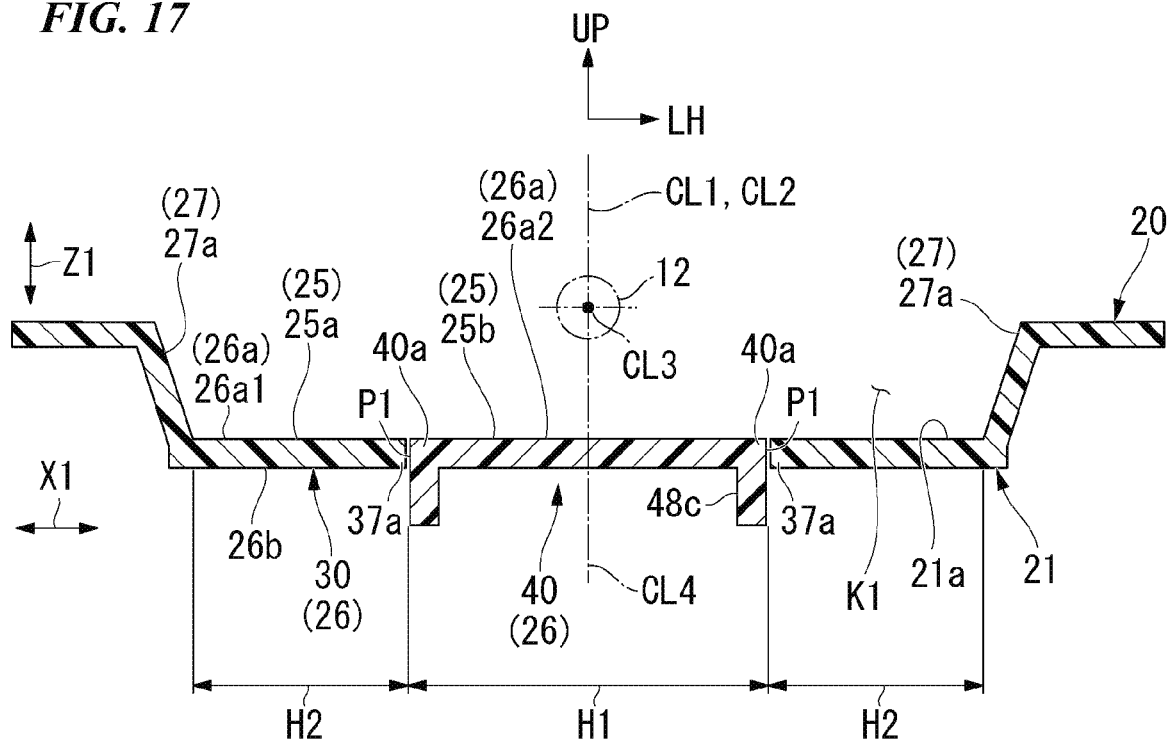
FIG. 17 is a view for describing a variant corresponding to the cross-sectional view along line A-A in FIG. 9.
Figure 18:
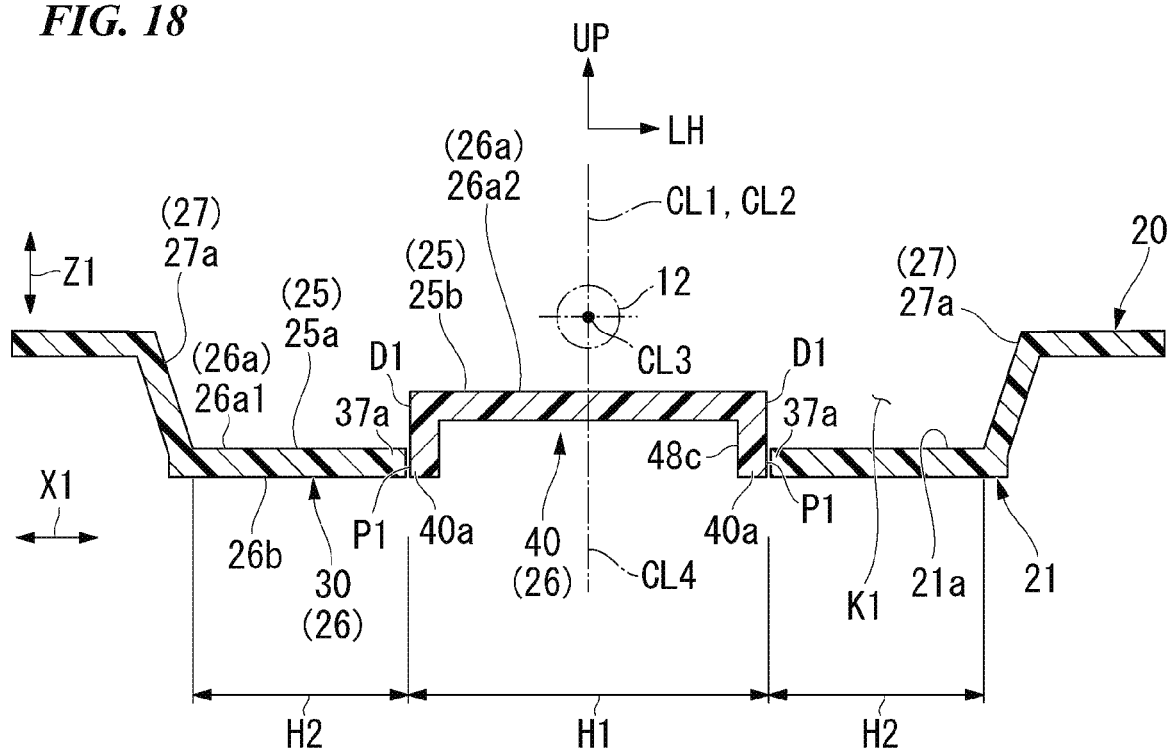
FIG. 18 is a view for describing a variant corresponding to the cross-sectional view along line A-A in FIG. 9.

In the examples in FIG. 17 and FIG. 19, the split body 40 and the fixed body 30 are disposed to be flush with each other on the side of the front surface, and the split body 40 protrudes on the side of the back surface. In the example in FIG. 18 and FIG. 20, the split body 40 and the fixed body 30 are disposed to be flush with each other on the side of the back surface, and the split body 40 protrudes on the side of the front surface.

A positional relationship of the lens 12 and the optical axis CL3 with respect to the stepped surface D1 of the split section P1 between the split body 40 and the fixed body 30 will be described with reference to FIG. 21 to FIG. 23.

Figure 21:
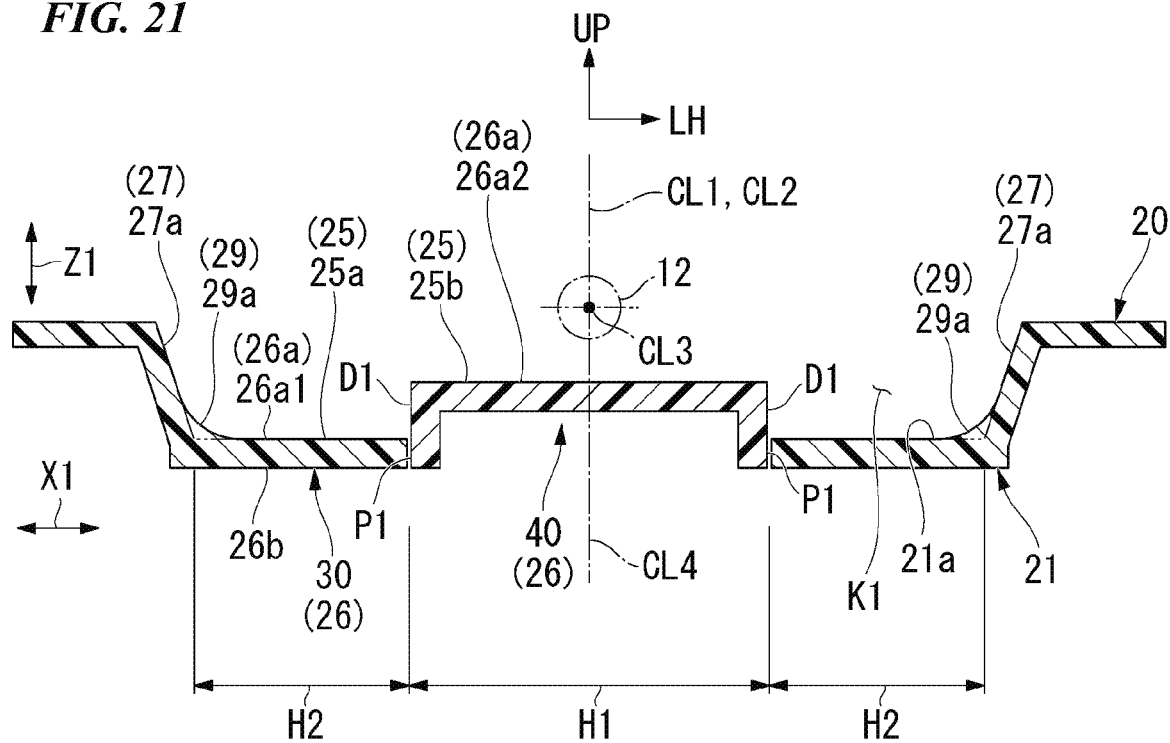
FIG. 21 is a view for description corresponding to the cross-sectional view along line A-A in FIG. 9, showing a positional relationship between an optical axis and a stepped surface of the split section.

As shown in FIG. 21, in the case in which the optical axis CL3 of the lens 12, the split body 40 and a width direction center CL4 of the reflected wave-reducing structure 25 coincide with each other when seen in a plan view, when the split body 40 is disposed high, since the stepped surface D1 is not directed toward the lens 12, an influence of the external field-detecting camera 10 on detection accuracy is minimized while light or the like is not reflected from the stepped surface D1 toward the lens 12.

Figure 22:
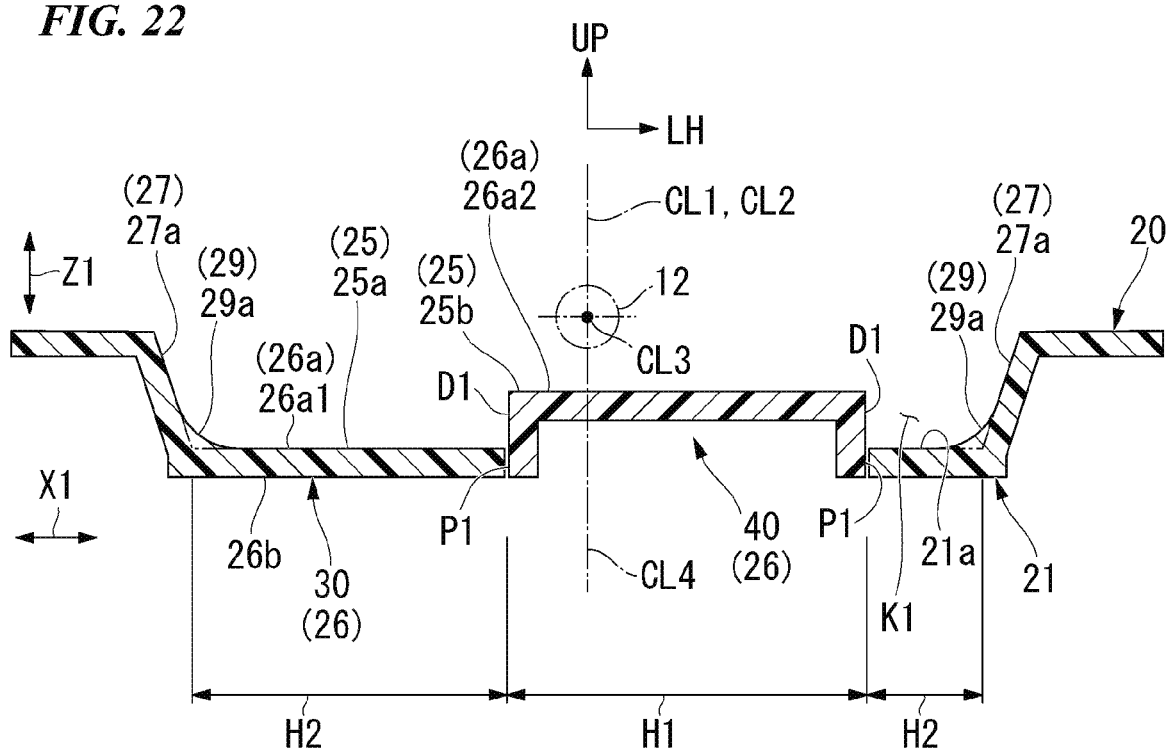
FIG. 22 is a view for description corresponding to the cross-sectional view along line A-A in FIG. 9, showing a positional relationship between an optical axis and a stepped surface of the split section.

As shown in FIG. 22, when the split body 40 is offset with respect to the optical axis CL3 of the lens 12 in the surface width direction X1, the stepped surfaces D1 of both sides of the split body 40 are also offset according thereto. However, when the split body 40 disposed higher than the fixed body 30 is disposed in the first range H1 including the optical axis CL3 of the lens 12 (when the first range H1 is configured), since the stepped surfaces D1 of both sides of the split body 40 are directed toward the lens 12, an influence of the external field-detecting camera 10 on detection accuracy is minimized without reflecting light or the like from the stepped surface D1 toward the lens 12.

Figure 23:
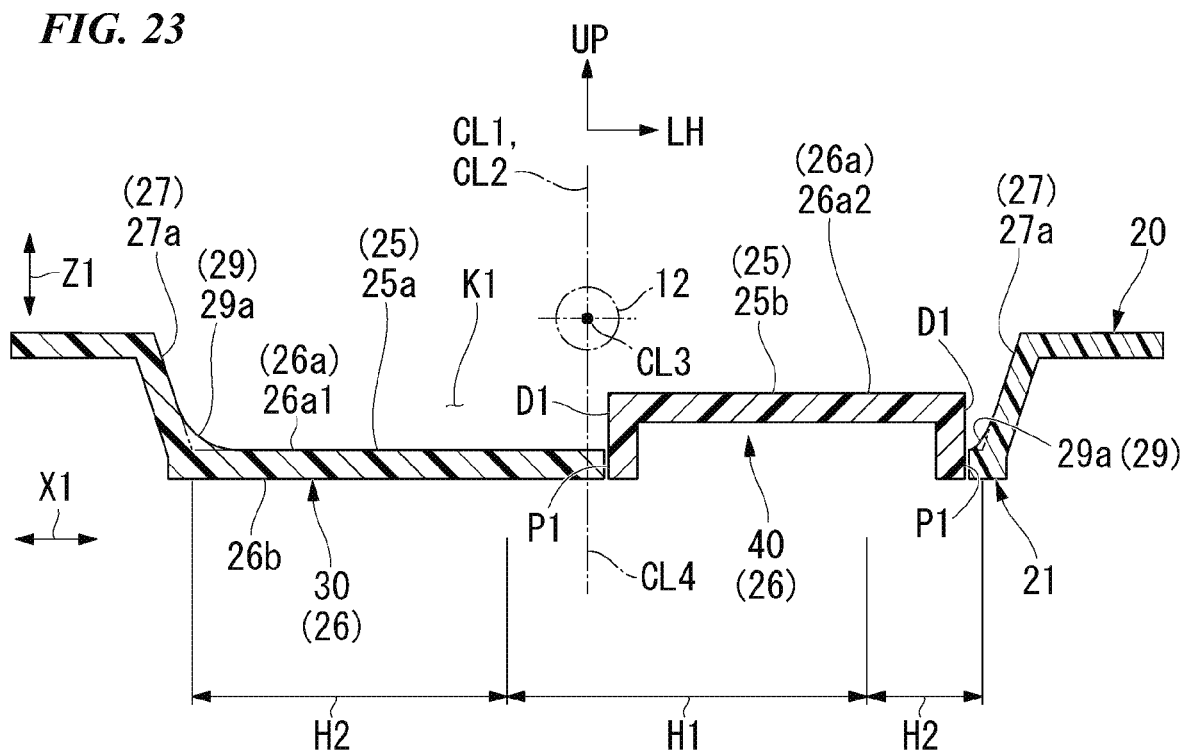
FIG. 23 is a view for description corresponding to the cross-sectional view along line A-A in FIG. 9, showing a positional relationship between an optical axis and a stepped surface of the split section.

Meanwhile, as shown in FIG. 23, when the split body 40 disposed higher than the fixed body 30 is offset to the second range H2 that does not include the optical axis CL3 of the lens 12 (when the second range H2 is configured), since the stepped surface D1 of one in the stepped surface D1 of both sides of the split body 40 is disposed toward the lens 12, reflection of light or the like from the stepped surface D1 toward the lens 12 may occur, and an influence of the external field-detecting camera 10 on detection accuracy may occur. In such disposition of the split body 40, an area that configures the first range H1 including the optical axis CL3 in the fixed body 30 may be disposed higher than the split body 40.

That is, regardless of whether the stepped surface D1 that appears on the bottom surface 26a is configured as the split body 40 or the fixed body 30, since the first range H1 including the optical axis CL3 is configured to be disposed higher than the second range H2 that avoids the optical axis CL3, the occurrence of reflection of light from the stepped surface D1 toward the lens 12 can be minimized.

The lens hood 21 is disposed to cause the bottom surface 26a to direct upward, and dirt such as dusts tends to easily accumulate on the bottom surface 26a while being closed by the front window glass 3. In the embodiment, maintenance such as cleaning or the like of the bottom surface 26a is facilitated by providing the split body 40 that is detachably attached to the bottom surface-forming section 26.

In addition, in the lens hood 21, a curved surface 29a having a recessed shape and configured to connect the bottom surface 26a and the side surfaces 27a is formed in a corner section 29 between the bottom surface-forming section 26 and the side surface-forming section 27. Accordingly, even when the bottom surface 26a is cleaned, it is easier to clean up the corner section 29 where the bottom surface 26a and the side surfaces 27a cross each other.

Then, the reflected wave-reducing structure 25 included in the bottom surface 26a reaches the curved surface 29a, and irregular reflection of light or the like rising from the bottom surface 26a from the curved surface 29a toward the lens 12 is effectively minimized.

As described above, the camera bracket 20 in the embodiment is the camera bracket 20 configured to support the external field-detecting camera 10 on the vehicle main body 1a and includes the lens hood 21 extending from the lens 12 side of the external field-detecting sensor 10 in the detecting direction F1 and surrounding the detection space K1 through which the optical axis CL3 of the lens 12 passes, the lens hood 21 includes the bottom surface-forming section 26 that forms the flat bottom surface 26a facing the detection space K1, and the bottom surface-forming section 26 includes the fixed body 30 including a part of the bottom surface 26a (the fixed-side bottom surface 26a1) and fixed to the vehicle main body 1a, and the split body 40 including the other part of the bottom surface 26a (the split-side bottom surface 26a2) and configured to be separable from the fixed body 30.

Then, provided that the direction perpendicular to the detecting direction F1 in the bottom surface 26a when seen in a plan view is referred to as the surface width direction X1, the direction perpendicular to the surface width direction X1 in the bottom surface 26a when seen in a plan view is referred to as the surface forward/rearward direction Y1, and the direction perpendicular to the surface width direction X1 and the surface forward/rearward direction Y1 is referred to as the height direction Z1, when seen from the height direction Z1, the split section P1 between the fixed body 30 and the split body 40 divides the bottom surface 26a into the first range H1 including the optical axis CL3 in the surface width direction X1 and the second range H2 that avoids the optical axis CL3, and the first range H1 is disposed closer to the optical axis CL3 than the second range H2 in the height direction Z1.

According to the configuration, since the bottom surface-forming section 26 that forms the flat bottom surface 26a facing the detection space K1 in the lens hood 21 includes the fixed body 30 fixed to the vehicle main body 1a and the split body 40 separable from the fixed body 30, even in the case of access into the lens hood 21 during maintenance, parts attached to and detached from the vehicle main body 1a may be small. That is, when an angle of view (an angle of visibility, a radiation/incidence angle in the case of an electric wave sensor) is widened due to improvement in performance (an wide angle) of the external field-detecting camera 10, since the bottom surface 26a having a wide and flat shape is formed on the lens hood 21 according to the widening, in the configuration in which the bottom surface-forming section 26 that forms the bottom surface 26a is attached and detached as a whole, attached and detached parts are large and workability may be decreased. On the other hand, since the bottom surface-forming section 26 that forms the flat bottom surface 26a includes the split body 40 that is separable from the fixed body 30, parts that are attached and detached in the case of access into the lens hood 21 may be small, and workability can be improved.

Here, since the bottom surface-forming section 26 is divided, a step difference may occur in the flat bottom surface 26a in the split section P1 between the fixed body 30 and the split body 40. Here, since the first range H1 including the optical axis CL3 in the bottom surface 26a in the surface width direction X1 is set to be disposed closer to the optical axis CL3 in the height direction Z1 than the second range H2 that does not include the optical axis CL3 in the bottom surface 26a in the surface width direction X1, even when a step difference occurs between the fixed body 30 and the split body 40, the stepped surface D1 (a surface crossing the bottom surface 26a) is disposed so as not to be directed toward the optical axis CL3. Accordingly, irregular reflection of electromagnetic waves toward the lens 12 can be minimized, and an influence of the external field-detecting camera 10 on detection accuracy can be minimized.

In the camera bracket 20 in the embodiment, the bottom surface 26a includes the reflected wave-reducing structure 25 configured to reduce reflected light that reaches the lens 12.

According to the configuration, when the bottom surface-forming section 26 including the reflected wave-reducing structure 25 is provided as a split structure while irregular reflection of light or the like toward the lens 12 is minimized by the reflected wave-reducing structure 25, even if a step difference occurs in the flat bottom surface 26a (the reflected wave-reducing structure 25), irregular reflection of light or the like toward the lens 12 can be appropriately minimized.

The camera bracket 20 in the embodiment is constituted by the split body 40 while the first range H1 of the front surface 26a is positioned inside the front surface 26a in the surface width direction X1.

According to the configuration, since the inner side of the bottom surface 26a in the surface width direction X1 is constituted by the split body 40, attachment and detachment works, and the like, can be simplified using the split body 40 as a single configuration, and the split structure having good efficiency can be provided. That is, when the outer side of the bottom surface 26a in the surface width direction X1 is constituted by the split body 40, while it is conceivable that a plurality of split bodies 40 are provided and attachment/detachment work is complicated, since the inside of the bottom surface 26a in the surface width direction X1 is constituted by the split body 40, the split structure with good balance can be simply provided.

In the camera bracket 20 in the embodiment, the fixed body 30 includes the fixed-side opening section 37 configured to be fitted onto and to close the split body 40, and the outer circumferential section 40a of the split body 40 includes the overlapping section 40b that overlaps the inner circumferential section 37a of the fixed-side opening section 37 from the side of the back surface 26b that is a surface opposite to the front surface 26a of the bottom surface-forming section 26.

According to the configuration, since the outer circumferential section 40a of the split body 40 includes the overlapping section 40b that overlaps the inner circumferential section 37a of the fixed-side opening section 37 from the side of the back surface 26b of the bottom surface-forming section 26, upon attachment of the split body 40, the split body 40 can be prevented from falling into the fixed-side opening section 37. In addition, when seen from the height direction Z1 in a state in which the split body 40 is attached to the fixed-side opening section 37, since overlapping between the outer circumferential section 40a of the split body 40 and the inner circumferential section 37a of the fixed-side opening section 37 occurs to eliminate the occurrence of the gap, intrusion of electromagnetic waves into the lens hood 21 can be minimized.

In the camera bracket 20 in the embodiment, the fixed body 30 includes the fixed-side opening section 37 configured to be fitted onto and to close the split body 40, and each of the outer circumferential section 40a of the split body 40 and the inner circumferential section 37a of the fixed-side opening section 37 includes first direction abutting surfaces 37s1 and 40s1 that are able to abut the other crossing the bottom surface 26a in the height direction Z1, and second direction abutting surfaces 37s2 and 40s2 that are able to abut the other in the surface width direction X1 and the surface forward/rearward direction Y1 along the bottom surface 26a.

According to the configuration, since each of the outer circumferential section of the split body 40 and the inner circumferential section of the fixed-side opening section 37 includes first direction abutting surfaces 37s1 and 40s1 that are able to abut the other in the direction crossing the bottom surface 26a, and second direction abutting surfaces 37s2 and 40s2 that are able to abut the other in the direction along the bottom surface 26a, when the split body 40 is fitted into the fixed-side opening section 37, the position of the split body 40 is defined in the direction crossing the bottom surface 26a of the bottom surface-forming section 26 by the first direction abutting surfaces 37s1 and 40s1, and the position of the split body 40 is defined in the direction along the bottom surface 26a of the bottom surface-forming section 26 by the second direction abutting surfaces 37s2 and 40s2. Accordingly, attachment of the split body 40 to a prescribed position can be facilitated. In the area where first direction abutting surfaces 37s1 and 40s1 are formed, since overlapping occurs between the outer circumferential section 40a of the split body 40 and the inner circumferential section 37a of the fixed-side opening section 37, intrusion of electromagnetic waves into the lens hood 21 can be minimized.

In the camera bracket 20 in the embodiment, the fixed body 30 includes the fixed-side opening section 37 configured to be fitted onto and to close the split body 40, and at least one of the outer circumferential section 40a of the split body 40 and the inner circumferential section 37a of the fixed-side opening section 37 includes the inclined surfaces 37s3 and 40s3 inclined to be disposed closer to the outer circumferential side of the fixed-side opening section 37 as they go toward the back surface 26b of the bottom surface-forming section 26 and overlapping the other in the surface width direction X1 and the surface forward/rearward direction Y1 along the bottom surface 26a.

According to the configuration, since at least one of the outer circumferential section 40a of the split body 40 and the inner circumferential section 37a of the fixed-side opening section 37 includes the inclined surfaces 37s3 and 40s3 inclined to be disposed closer to the outer circumferential side of the fixed-side opening section 37 as they go toward the back surface 26b, at least one of an aspect in which the inner circumferential section 37a of the fixed-side opening section 37 is formed to be widened as it goes toward the back surface 26b (an outer side of the lens hood 21) and an aspect in which the outer circumferential section 40a of the split body 40 is formed to be narrowed as it goes toward the bottom surface 26a (an inner side of the lens hood 21) is realized. Accordingly, the split body 40 is easily attached from the outside of the lens hood 21. In the area where the inclined surfaces 37s3 and 40s3 are formed, since the overlapping occurs between the outer circumferential section 40a of the split body 40 and the inner circumferential section 37a of the fixed-side opening section 37, intrusion of electromagnetic waves into the lens hood 21 can be minimized.

In the camera bracket 20 in the embodiment, the recess section 48c is formed in the split body 40 on the side of the back surface 26b.

According to the configuration, since the recess section 48c is formed in the split body 40, a load of attachment and detachment work of the split body 40 can be reduced while achieving reduction in weight of the split body 40 and reducing a load of an area to which the split body 40 is attached.

In the camera bracket 20 in the embodiment, functional parts (for example, the heater 49) are disposed on the split body 40 on the side of the back surface 26b.

According to the configuration, since the recess section 48c formed in the split body 40 is used as a disposition space of the functional parts, a dead space can be effectively utilized.

In the camera bracket 20 in the embodiment, the functional part is the heater 49 configured to increase a temperature in the detection space K1.

According to the configuration, since the heater 49 is close to the detection space K1 to efficiently increase the temperature, clouding of the transmission member such as window glass or the like with which the lens hood 21 abuts can be efficiently minimized.

In the camera bracket 20 in the embodiment, the lens hood 21 is disposed while the bottom surface 26a is directed upward.

According to the configuration, since the flat bottom surface 26a is disposed in a vertical upward direction, even when cleaning of dust or the like is required, cleaning can be easily performed by removing the split body 40, and detection accuracy can be appropriately maintained.

In the camera bracket 20 in the embodiment, the lens hood 21 includes the side surface-forming section 27 that forms the side surfaces 27a standing upward from the end portion of the bottom surface 26a in the surface width direction X1, and the curved surface 29a having a recessed shape and configured to connect the bottom surface 26a and the side surfaces 27a is formed in the corner section 29 between the bottom surface-forming section 26 and the side surface-forming section 27.

According to the configuration, since the curved surface 29a having a recessed shape is provided in the corner section 29 in which the bottom surface 26a and the side surfaces 27a cross each other, even when the bottom surface 26a is cleaned, the cleaning is easily performed to the corner section 29 in which the bottom surface 26a and the side surfaces 27a cross each other, and detection accuracy can be appropriately maintained.

In the camera bracket 20 in the embodiment, the bottom surface 26a and the curved surface 29a are provided with the reflected wave-reducing structure 25 configured to reduce reflected light that reaches the lens 12.

According to the configuration, since the reflected wave-reducing structure 25 is provided not only on the flat bottom surface 26a but also on the curved surface 29a of the corner section 29 in which the bottom surface 26a and the side surfaces 27a cross each other, irregular reflection toward the lens 12 can be further minimized.

Further, the present invention is not limited to the embodiment, and for example, the camera bracket 20 is not limited to the configuration fixed to the front window glass 3 and may be fixed to a vehicle body such as a roof, a front pillar, or the like, other than the front window glass 3. In this case, the camera bracket 20 may have a configuration in which the lens hood 21 extends from a fixed position to a vehicle body in the detecting direction F1 (toward the front window glass 3). The lens hood 21 may be configured to be disposed close to the front window glass 3 without contacting with the front window glass 3. The opening 21b of the lens hood 21 is not limited to the configuration in which the opening 21b is in contact with the front window glass 3 and completely closed, and may have a configuration in which the opening 21b is disposed to have a somewhat gap with respect to the front window glass 3. The lens hood 21 is not limited to being fixed to the front window glass 3 (the transmission member). The vehicle 1 is not limited to the configuration in which the external field-detecting camera 10 is supported by the camera bracket 20 and may have a configuration in which the camera bracket 20 is supported by the external field-detecting camera 10. In this case, the fixed body 30 is indirectly fixed to a vehicle main body 1a.

The external field-detecting sensor is not limited to being installed on a window in the front of the passenger compartment and detecting a side in front of the vehicle, and may be installed on the window at a side of the passenger compartment and detect a side of the vehicle or may be installed on a window in the rear of the passenger compartment and detect a side behind the vehicle. The transmission member disposed in the detecting direction of the external field-detecting sensor is not limited to the window member such as a windshield or the like installed on the window of the passenger compartment, and for example, may be a transmission member installed in a detecting direction of a sensor-installed place when a sensor is installed inside external parts or the like. The transmission member disposed in the detecting direction of the external field-detecting sensor is not limited to glass and may be a resin or the like. In the case of the transportation equipment having no passenger compartment such as a motorcycle or the like, an installation place of the external field-detecting sensor is not the window member and may be a transmission member such as a screen or the like of a cowl.

For example, the camera may be a camera configured to capture invisible light such as infrared light or the like as well as visible light. The camera may be an electric wave sensor such as radar or the like using infrared light or micro waves such as millimeter waves or the like as well as the optical sensor such as a camera or the like. Disposition of the lenses of the camera in the embodiment is disposition of antennae in the case of radar. The sensor is not a single sensor and may have a configuration including a plurality of sensors such as a stereo camera or the like. A configuration in which a camera and radar are used together may be provided.

The vehicle 1 of the embodiment is an example of the transportation equipment, and the vehicle as the transportation equipment to which the present invention is applied is not limited to a passenger car and may also include a freight vehicle, and further, is not limited to a vehicle having a passenger compartment and may also include a small saddle riding vehicle such as a motorcycle or the like. The vehicle is a two-wheeled, three-wheeled, four-wheeled vehicle, or the like, and a driving source thereof is an internal combustion engine such as a gasoline engine, a diesel engine, or the like, an electric motor, or a combination thereof. The electric motor is operated using a generated output by a generator connected to an internal combustion engine or a discharged output by a secondary battery or a fuel cell. In addition, the transportation equipment also includes bicycles, trains, ships, aircrafts, and the like.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1 Vehicle (transportation equipment)
1a Vehicle main body (support body)
10 External field-detecting camera (external field-detecting sensor)
12 Lens (detection unit)
F1 Detecting direction
CL3 Optical axis (detection center axis)
K1 Detection space
20 Camera bracket (sensor bracket)
21 Lens hood (sensor hood)
25 Reflected wave-reducing structure 26 Bottom surface-forming section (front surface-forming section)
26a Bottom surface (front surface)
26a1 Fixed-side bottom surface (one part)
26a2 Split-side bottom surface (another part)
26b Back surface
27 Side surface-forming section
27a Side surface
29 Corner section
29a Curved surface
30 Fixed body
37 Fixed-side opening section
37a Inner circumferential section
37s1 First direction abutting surface
37s2 Second direction abutting surface
37s3 Inclined surface
40 Split body
40a Outer circumferential section
40s1 First direction abutting surface
40s2 Second direction abutting surface
40s3 Inclined surface
40b Overlapping section
48c Recess section
49 Heater (functional parts)
X1 Surface width direction
Y1 Surface forward/rearward direction
Z1 Height direction
P1 Split section
H1 First range
H2 Second range

What is claimed is:

1. A sensor bracket comprising:
a sensor hood extending in a detecting direction from a side of a detection unit of an external field-detecting sensor configured to detect electromagnetic waves, and surrounding a detection space through which a detection center axis of the detection unit passes,
wherein the sensor hood comprises a front surface-forming section that forms a flat front surface facing the detection space,
the front surface-forming section comprises a fixed body including a part of the front surface and a split body including another part of the front surface and configured to be separable from the fixed body,
where a direction perpendicular to the detecting direction in the front surface when seen in a plan view is referred to as a surface width direction, a direction perpendicular to the surface width direction in the front surface when seen in the plan view is referred to as a surface forward/rearward direction, and a direction perpendicular to the surface width direction and the surface forward/rearward direction is referred to as a height direction,
when seen from the height direction, a split section between the fixed body and the split body divides the front surface into a first range including the detection center axis in the surface width direction and a second range that avoids the detection center axis,
the first range is disposed higher than the second range in a height direction and disposed closer to the detection center axis than the second range; and
the first range of the front surface is disposed further inside the front surface in the surface width direction than the split section, and constituted by the split body.

2. The sensor bracket according to claim 1, wherein the front surface comprises a reflected wave-reducing structure configured to reduce reflected waves that reach the detection unit.

3. The sensor bracket according to claim 1, wherein the fixed body comprises a fixed-side opening section that is fitted into and closes the split body, and
an outer circumferential section of the split body comprises an overlapping section that overlaps an inner circumferential section of the fixed-side opening section from a side of a back surface that is a surface opposite to the front surface of the front surface-forming section.

4. The sensor bracket according to claim 1, wherein the fixed body comprises a fixed-side opening section that is fitted into and closes the split body, and
each of an outer circumferential section of the split body and an inner circumferential section of the fixed-side opening section comprises a first direction abutting surface that is able to abut the other in a direction crossing the front surface and a second direction abutting surface that is able to abut the other in a direction along the front surface.

5. The sensor bracket according to claim 1, wherein the fixed body comprises a fixed-side opening section that is fitted into and closes the split body, and
at least one of an outer circumferential section of the split body and an inner circumferential section of the fixed-side opening section comprises an inclined surface that is inclined to be disposed closer to an outer circumferential side of the fixed-side opening section toward a side of a back surface that is a surface opposite to the front surface of the front surface-forming section and overlaps the other in the direction along the front surface.

6. The sensor bracket according to claim 1, wherein a recess section is formed in the split body on a side of a back surface that is a surface opposite to the front surface.

7. The sensor bracket according to claim 1, wherein a functional part is disposed in the split body on a side of a back surface that is a surface opposite to the front surface.

8. The sensor bracket according to claim 7, wherein the functional part is a heater configured to increase a temperature in the detection space.

9. The sensor bracket according to claim 1, wherein the sensor hood is disposed with the front surface directed upward.

10. The sensor bracket according to claim 9, wherein the sensor hood comprises a side surface-forming section that forms a side surface standing upward from an end portion of the front surface in the surface width direction, and
a curved surface having a recessed shape and connecting the front surface and the side surface is formed in a corner section between the front surface-forming section and the side surface-forming section.

11. The sensor bracket according to claim 10, wherein the front surface and the curved surface are provided with a reflected wave-reducing structure configured to reduce reflected waves that reach the detection unit.

12. A sensor bracket comprising: a sensor hood extending in a detecting direction from a side of a detection unit of an external field-detecting sensor configured to detect electromagnetic waves, and surrounding a detection space through which a detection center axis of the detection unit passes,
wherein the sensor hood comprises a front surface-forming section that forms a flat front surface facing the detection space, the front surface-forming section comprises a fixed body including a part of the front surface and a split body including another part of the front surface and configured to be separable from the fixed body, where a direction perpendicular to the detecting direction in the front surface when seen in a plan view is referred to as a surface width direction, a direction perpendicular to the surface width direction in the front surface when seen in the plan view is referred to as a surface forward/rearward direction, and a direction perpendicular to the surface width direction and the surface forward/rearward direction is referred to as a height direction, when seen from the height direction, a split section between the fixed body and the split body divides the front surface into a first range including the detection center axis in the surface width direction and a second range that avoids the detection center axis, the first range is disposed at the same height as the second range in the height direction or disposed closer to the detection center axis than the second range, and the first range of the front surface is disposed further inside the front surface in the surface width direction than the split section, and constituted by the split body.

13. The sensor bracket according to claim 12, wherein the front surface comprises a reflected wave-reducing structure configured to reduce reflected waves that reach the detection unit.

14. The sensor bracket according to claim 12, wherein the fixed body comprises a fixed-side opening section that is fitted into and closes the split body, and an outer circumferential section of the split body comprises an overlapping section that overlaps an inner circumferential section of the fixed-side opening section from a side of a back surface that is a surface opposite to the front surface of the front surface-forming section.

15. The sensor bracket according to claim 12, wherein the fixed body comprises a fixed-side opening section that is fitted into and closes the split body, and each of an outer circumferential section of the split body and an inner circumferential section of the fixed-side opening section comprises a first direction abutting surface that is able to abut the other in a direction crossing the front surface and a second direction abutting surface that is able to abut the other in a direction along the front surface.

16. The sensor bracket according to claim 12, wherein the fixed body comprises a fixed-side opening section that is fitted into and closes the split body, and at least one of an outer circumferential section of the split body and an inner circumferential section of the fixed-side opening section comprises an inclined surface that is inclined to be disposed closer to an outer circumferential side of the fixed-side opening section toward a side of a back surface that is a surface opposite to the front surface of the front surface-forming section and overlaps the other in the direction along the front surface.

17. The sensor bracket according to claim 12, wherein a recess section is formed in the split body on a side of a back surface that is a surface opposite to the front surface.

18. The sensor bracket according to claim 12, wherein a functional part is disposed in the split body on a side of a back surface that is a surface opposite to the front surface.

19. The sensor bracket according to claim 18, wherein the functional part is a heater configured to increase a temperature in the detection space.

20. The sensor bracket according to claim 12, wherein the sensor hood is disposed with the front surface directed upward.

21. The sensor bracket according to claim 20, wherein the sensor hood comprises a side surface-forming section that forms a side surface standing upward from an end portion of the front surface in the surface width direction, and a curved surface having a recessed shape and connecting the front surface and the side surface is formed in a corner section between the front surface-forming section and the side surface-forming section.

22. The sensor bracket according to claim 21, wherein the front surface and the curved surface are provided with a reflected wave-reducing structure configured to reduce reflected waves that reach the detection unit.

* * * * *